United States Patent
Kawasumi et al.

(10) Patent No.: US 12,554,631 B2
(45) Date of Patent: Feb. 17, 2026

(54) INFORMATION PROCESSING APPARATUS AND MEMORY SYSTEM

(71) Applicant: Kioxia Corporation, Tokyo (JP)

(72) Inventors: Atsushi Kawasumi, Fujisawa Kanagawa (JP); Takashi Maeda, Kamakura Kanagawa (JP); Hidehiro Shiga, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 164 days.

(21) Appl. No.: 18/601,791

(22) Filed: Mar. 11, 2024

(65) Prior Publication Data

US 2024/0311286 A1  Sep. 19, 2024

(30) Foreign Application Priority Data

Mar. 16, 2023  (JP) ................. 2023-042356

(51) Int. Cl.
- *G11C 7/00* (2006.01)
- *G06F 12/02* (2006.01)
- *G11C 16/04* (2006.01)
- *G11C 16/26* (2006.01)

(52) U.S. Cl.
CPC .......... *G06F 12/02* (2013.01); *G11C 16/0483* (2013.01); *G11C 16/26* (2013.01); *G06F 2212/10* (2013.01)

(58) Field of Classification Search
CPC ....... G11C 7/1078; G11C 7/22; G11C 7/1006; G11C 7/1073; G11C 7/1096
USPC ..................................... 365/189.16
See application file for complete search history.

(56) References Cited

U.S. PATENT DOCUMENTS

| | | | |
|---|---|---|---|
| 9,001,545 B2 | 4/2015 | Lee | |
| 9,001,563 B2 * | 4/2015 | Atsumi | H10D 86/423 365/210.1 |
| 9,595,330 B2 | 3/2017 | Wang | |
| 2021/0407595 A1 | 12/2021 | Advani et al. | |

* cited by examiner

*Primary Examiner* — Son T Dinh
(74) *Attorney, Agent, or Firm* — Foley & Lardner LLP

(57) ABSTRACT

An information processing apparatus that detects whether the corresponding first element and second element among the multiple first elements and the plurality of second elements are matched or are similar, has one or multiple strings connected to a first wiring and connected to multiple second wirings, wherein the string includes multiple transistor pairs connected in series along a current path having one end connected to the first wiring, each of the multiple transistor pairs includes a first transistor and a second transistor connected in series along the current path, the second wirings are connected to gates of the first transistor and the second transistor in each of the multiple transistor pairs, the first transistor is set to a first threshold depending on first data, the second transistor is set to a second threshold depending on second data that is complement data of the first data.

20 Claims, 22 Drawing Sheets

11 : MEMORY SYSTEM

| KEY | Q1 | Q2 |
|-----|-----|-----|
| 0 | $V_{th\_low}$ | $V_{th\_high}$ |
| 1 | $V_{th\_high}$ | $V_{th\_low}$ |
| X | $V_{th\_low}$ | $V_{th\_low}$ |

FIG. 3

| QUERY | Q1 | Q2 |
|-------|-----|-----|
| 0 | $V_{cgr1}$ | $V_{cgr2}$ |
| 1 | $V_{cgr2}$ | $V_{cgr1}$ |
| X | $V_{cgr2}$ | $V_{cgr2}$ |

FIG. 4

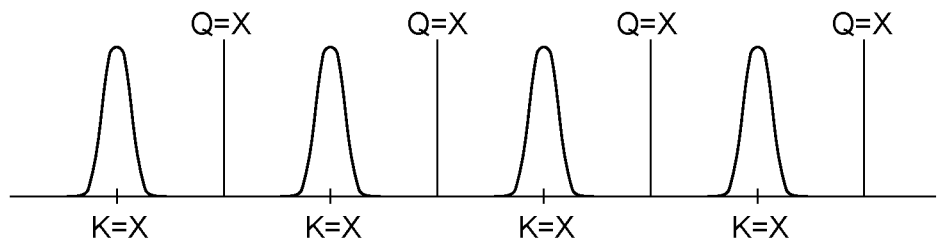
FIG. 5A
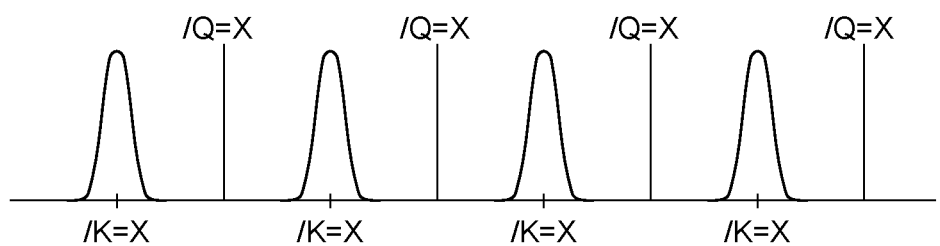
FIG. 5B
| | | QUERY Q | | |
|---|---|---|---|---|
| | | 0 | 1 | X |
| KEY | 0 | ON/ON ON | ON/OFF OFF | ON/ON ON |
| | 1 | OFF/ON OFF | ON/ON ON | ON/ON ON |
| | X | ON/ON ON | ON/ON ON | ON/ON ON |
FIG. 6

| QUERY | | KEY | | | |
|---|---|---|---|---|---|
| q0 | ⇒ | k00 | k01 | k02 | k03 |
| q1 | | k10 | k11 | k12 | k13 |
| q2 | | k20 | k21 | k22 | k23 |
| q3 | | k30 | k31 | k32 | k33 |
FIG. 7
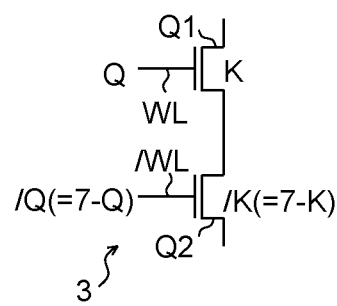
FIG. 8
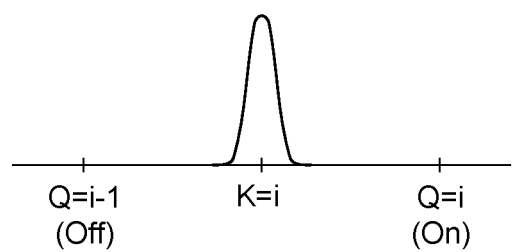
FIG. 9

| KEY | Q1 | Q2 |
|---|---|---|
| 0 | $V_{th\_low}$ | $V_{th\_high}$ |
| 1 | $V_{th\_high}$ | $V_{th\_low}$ |
| X | $V_{th\_low}$ | $V_{th\_low}$ |

FIG. 14

| QUERY | Q1 | Q2 |
|---|---|---|
| 0 | $V_{cgr1}$ | $V_{cgr2}$ |
| 1 | $V_{cgr2}$ | $V_{cgr1}$ |
| X | $V_{cgr1}$ | $V_{cgr1}$ |

FIG. 15

INFORMATION PROCESSING APPARATUS AND MEMORY SYSTEM

CROSS REFERENCE TO RELATED APPLICATIONS

This application is based upon and claims the benefit of priority from the prior Japanese Patent Application No. 2023-042356, filed on Mar. 16, 2023, the entire contents of which are incorporated herein by reference.

FIELD

An embodiment of the present invention relates to an information processing apparatus and a memory system.

BACKGROUND

Computation In Memory (CIM) that executes a large amount of arithmetic processing such as a product-sum operation at high speed using a semiconductor memory has attracted attention.

In CIM, for example, first input data used for arithmetic processing is stored in, for example, a memory cell, a voltage signal based on second input data is applied to a word line, and a voltage level of a bit line connected to the memory cell is changed according to an arithmetic result.

The recent semiconductor memory has been miniaturized, the voltage range of the bit line has been reduced, and the voltage level of the bit line is easily affected by noise and a leak voltage. Thus, it is not easy to correctly detect the arithmetic result from the voltage value of the bit line.

BRIEF DESCRIPTION OF THE DRAWINGS

FIG. 3 is a diagram illustrating a correspondence relationship between keys of FIG. 2, a first threshold of the first transistor, and a second threshold of the second transistor;

FIG. 4 is a diagram illustrating a correspondence relationship between bit values and potential levels of a query applied to gates of the first transistor and the second transistor via a word line;

FIG. 5A is a diagram illustrating voltage levels of a query and a key when the query or the key of the first transistor is X;

FIG. 5B is a diagram illustrating voltage levels of a query and a key when the query or the key of the second transistor is X;

FIG. 6 is a diagram illustrating an example in which the query and the key are binary data;

FIG. 7 is a diagram illustrating an example in which the query and the key are multi-valued data;

FIG. 8 is a diagram illustrating the first transistor and the second transistor in a string when the query and the key are 3-bit multi-value data;

FIG. 9 is a diagram illustrating a relationship between a threshold and a gate voltage of the first transistor and the second transistor;

FIG. 14 is a diagram illustrating a correspondence relationship between keys in FIG. 13A and FIG. 13B, a first threshold of the first transistor, and a second threshold of the second transistor;

FIG. 15 is a diagram illustrating a correspondence relationship between bit information and a potential level of a query applied to gates of the first transistor and the second transistor via a word line;

DETAILED DESCRIPTION

According to one embodiment, an information processing apparatus that detects, between a first vector including a plurality of first elements and a second vector including a plurality of second elements corresponding to the plurality of first elements, whether or not the corresponding first element and second element among the plurality of first elements and the plurality of second elements are matched or are similar, has one or a plurality of strings connected to a first wiring and connected to a plurality of second wirings, wherein the string includes a plurality of transistor pairs connected in series along a current path having one end connected to the first wiring, each of the plurality of transistor pairs includes a first transistor and a second transistor connected in series along the current path, the second wirings different from each other are respectively connected to gates of the first transistor and the second transistor in each of the plurality of transistor pairs, the first transistor is set to a first threshold depending on first data representing the corresponding first element of the first vector, the second transistor is set to a second threshold depending on second data that is complement data of the first data, a voltage depending on third data representing the corresponding second element of the second vector is applied to the second wiring connected to the gate of the first transistor, and a voltage depending on fourth data that is complement data of the third data is applied to the second wiring connected to the gate of the second transistor.

Hereinafter, embodiments of an information processing apparatus and a memory system will be described with reference to the drawings. Although main components of the information processing apparatus and the memory system will be mainly described below, the information processing apparatus and the memory system may have components and functions that are not illustrated or described. The following description does not exclude components and functions that are not illustrated or described.

First Embodiment

Figure 1:
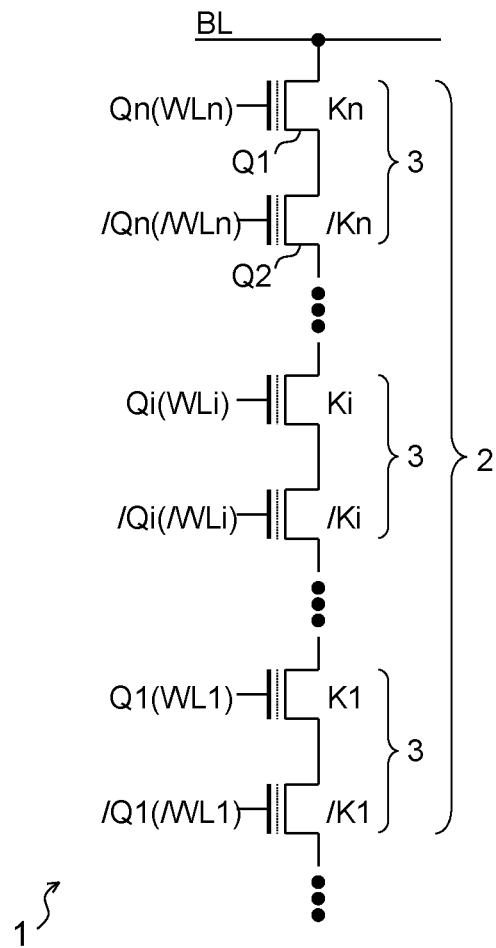
FIG. 1 is a circuit diagram of a main part of an information processing apparatus according to a first embodiment.

FIG. 1 is a circuit diagram of a main part of an information processing apparatus 1 according to a first embodiment. The information processing apparatus 1 in FIG. 1 detects, between a first vector including a plurality of first elements and a second vector including a plurality of second elements corresponding to the plurality of first elements, whether or not a corresponding first element and second element among the plurality of first elements and the plurality of second elements are matched or are similar.

The information processing apparatus 1 of FIG. 1 includes a string 2 connected to a first wiring and connected to a plurality of second wirings. Hereinafter, the first wiring is referred to as a bit line BL, and the second wirings are referred to as word lines WL1 to WLn, but the first wiring may be referred to as word lines WL1 to WLn, and the second wiring may be referred to as a bit line BL. In the present specification, the plurality of word lines WL1 to WLn may be collectively referred to simply as WL.

The string 2 includes a plurality of transistor pairs 3 having one end connected to the bit line BL and each of which is cascode-connected. In FIG. 1, only one string 2 is connected to one bit line BL, but as will be described later, a configuration in which a plurality of strings 2 are connected to one bit line BL may also be adopted. As will be described later, a configuration in which one or more strings 2 are connected to each of a plurality of bit lines BL may also be adopted. The other end of string 2 is connected to a reference voltage node (e.g., ground node).

Each of the plurality of transistor pairs 3 includes a first transistor Q1 and a second transistor Q2 that are cascode-connected. Different word lines WL and /WL are connected to the gates of the first transistor Q1 and the second transistor Q2 in each of the plurality of transistor pairs 3. In the present specification, the complement data of certain data A is expressed as /A. The complement data /A is data obtained by inverting each bit of the data A.

The first transistor Q1 is set to a first threshold depending on first data representing a corresponding first element of the first vector. The second transistor Q2 is set to a second threshold set depending on second data that is complement data of the first data. The complement data of the first data is data obtained by inverting each bit value of the first data. In this manner, in the first data and the second data, the bits are inverted from each other.

A voltage depending on a third data representing a corresponding second element of the second vector is applied to the word line WL connected to the gate of the first transistor Q1. A voltage depending on a fourth data that is complement data of the third data is applied to the word line /WL connected to the gate of the second transistor Q2. The complement data of the third data is data obtained by inverting each bit value of the third data.

In the string 2, when the corresponding first elements and second elements of the first vector and the second vector are all matched, all the first transistors Q1 and the second transistors Q2 in the plurality of transistor pairs 3 are turned on, and the current from the bit line BL is drawn to lower the voltage of the bit line BL.

In this manner, the voltage of the bit line BL decreases only when the corresponding first elements and second elements of the first vector and the second vector are all matched. Thus, monitoring the voltage of the bit line BL makes it possible to simply and quickly detect whether or not all the corresponding first elements and second elements of the first vector and the second vector are matched.

The plurality of transistor pairs 3 constituting the string 2 is provided in, for example, a memory cell array. The memory cell array is, for example, a NAND flash memory cell array.

The first transistor Q1 and the second transistor Q2 constituting each of the plurality of transistor pairs 3 in each string 2 are used to store a key K having a bit number of one bit or more. First, an example in which the key K takes a binary value (0 or 1) will be described. In the present specification, the above-described first data may be referred to as a key K. The second data that is the complement data of the first data corresponds to the complement data of the key K. The complement data of the key K is expressed as /K.

The first transistor Q1 in the string 2 stores the bit value of the key K, and the second transistor Q2 cascode-connected to the first transistor Q1 stores the complement data of the key K. The complement data of the key K is data obtained by inverting the bit value of the key K. For example, when the first transistor Q1 stores 0, the second transistor Q2 stores 1.

In the present specification, the first transistor Q1 storing 0 means that the threshold of the first transistor Q1 is set to 0. In practice, the threshold of the first transistor Q1 is set to a voltage level corresponding to 0, but in the present specification, for the sake of simplicity, it is assumed that the threshold is set to 0.

Two word lines WL and /WL are connected to each of the plurality of transistor pairs 3 in the string 2. More specifically, two separate word lines (WL1, /WL1), . . . , (WLn, /WLn) are respectively connected to the plurality of transistor pairs 3. Voltages depending on the third data and the fourth data are applied to the two word lines WL and /WL, respectively. In the present specification, it is assumed that the word line WL is connected to the gate of the first transistor Q1 constituting each transistor pair 3, the word line /WL is connected to the gate of the second transistor Q2, the third data is applied to the word line WL, and the fourth data is applied to the word line /WL.

The third data and the fourth data each include a plurality of bits, and the fourth data is complement data of the third data. Although the number of bits of the third data and the fourth data can take any number, first, an example in which the third data and the fourth data take a binary value (0 or 1) will be described.

The information processing apparatus 1 according to the present embodiment detects, for each of the plurality of transistor pairs 3 in the string 2, whether or not the query Q having the number of bits of one bit or more input from the outside matches the key K stored in each transistor pair 3. In the present specification, the third data described above may be referred to as a query Q. The fourth data, which is the complement data of the third data, corresponds to the complement data of the query Q. The complement data of the query Q is expressed as /Q.

In the present embodiment, the key K (first data) is stored in the first transistor Q1 in each of the plurality of transistor pairs 3 in each string 2, and the complement data (second data) of the key K is stored in the second transistor Q2. The query Q (third data) is input from the word lines WL1 to WLn connected to the gates of the first transistors Q1 in each string 2, and the complement data /Q (fourth data) of the query Q is input from the word lines /WL1 to /WLn connected to the gates of the second transistors Q2 in each string 2. The query Q and the key K are compared between first transistor Q1 and the second transistor Q2 in the string 2.

Figure 2:
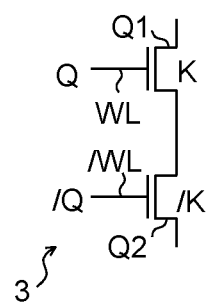
FIG. 2 is a diagram in which a first transistor and a second transistor constituting one transistor pair in a string are extracted.

FIG. 2 is a diagram in which the first transistor Q1 and the second transistor Q2 constituting one transistor pair 3 in the string 2 are extracted. As illustrated in FIG. 2, the key K (first data) stored in the first transistor Q1 and the key /K (second data) stored in the second transistor Q2 have a complementary relationship with each other. For example, when the key K is 0, the key /K is 1. In this manner, since voltages depending on the first data and the second data having a complementary relationship with each other are written in the first transistor Q1 and the second transistor Q2, the threshold of the first transistor Q1 and the threshold of the second transistor Q2 have values different from each other. The threshold of the first transistor Q1 is the first threshold, and the threshold of the second transistor Q2 is the second threshold.

FIG. 3 is a diagram illustrating a correspondence relationship between the key K (first data) in FIG. 2, the first threshold of the first transistor Q1, and the second threshold of the second transistor Q2. In the example of FIG. 3, the key K is 1-bit binary data. As illustrated in FIG. 3, when the key K is 0, the first threshold of the first transistor Q1 is set to Vth_low, and the second threshold of the second transistor Q2 is set to Vth_high. When the key K is 1, the first threshold of the first transistor Q1 is set to Vth_high, and the second threshold of the second transistor Q2 is set to Vth_low. Vth_high is a potential level higher than Vth_low. When the key K is X, both the first threshold of the first transistor Q1 and the second threshold of the second transistor Q2 are set to, for example, Vth_low. X corresponds to a case of don't care or indefinite.

In this manner, when the key K (first data) is 1, the first threshold of the first transistor Q1 is larger than that when the key K is 0. In the same manner, when the key /K (second data) is 1, the second threshold of the second transistor Q2 is larger than that when the key /K is 0.

FIG. 4 is a diagram illustrating a correspondence relationship between a bit value and a potential level of the query Q (third data) applied to the gates of the first transistor Q1 and the second transistor Q2 via the word lines WL and /WL. The query Q has a number of bits of 1 bit or more. FIG. 4 illustrates an example in which the query Q takes a binary value (0 or 1). A voltage (third data) depending on the query Q is applied to the gate of the first transistor Q1 via the word line WL. In the same manner, a voltage (fourth data) depending on the complement data of the query Q is applied to the gate of the second transistor Q2 via the word line /WL.

As illustrated in FIG. 4, when the query Q is 0, a voltage Vcgr1 (third data) is applied to the gate of the first transistor Q1, and a voltage Vcgr2 (fourth data) is applied to the gate of the second transistor Q2. When the query Q is 1, a voltage Vcrg2 (third data) is applied to the gate of the first transistor Q1, and a voltage Vcgr1 (fourth data) is applied to the gate of the second transistor Q2. Vcgr2>Vcgr1 works.

In this manner, the word lines WL and /WL connected to the gates of the first transistor Q1 and the second transistor Q2 are at the potential level of Vcgr1 or Vcgr2. When the query Q is X, all of the word lines WL and /WL connected to the gates of the first transistor Q1 and the second transistor Q2 are set to, for example, the potential level of Vcgr2. X corresponds to a case of don't care or indefinite.

FIG. 5A is a diagram illustrating voltage levels of the query Q and the key K of the first transistor Q1 when the query Q or the key K is X (don't care or undefined). FIG. 5A illustrates an example in which the first transistor Q1 has a threshold distribution of two bits. As illustrated in FIG. 5A, when the key K or the query Q is X, making the voltage level of the query Q higher than the threshold of the first transistor Q1 makes it possible to always turn on the first transistor Q1.

FIG. 5B is a diagram illustrating voltage levels of the query Q and the key K of the second transistor Q2 when the query Q or the key K is X (don't care or undefined). FIG. 5B illustrates an example in which the second transistor Q2 has a threshold distribution of two bits. As illustrated in FIG. 5B, when the key K or the query Q is X, making the voltage level of the query Q higher than the threshold of the second transistor Q2 makes it possible to always turn on the second transistor Q2.

FIG. 6 is a diagram illustrating all combinations of bit values of the query Q and the key K. FIG. 6 illustrates an example in which the query Q and the key K are binary data. FIG. 6 illustrates a case where the bit values of the query Q and the key K are not only 0 and 1 but also X (don't care or undefined).

FIG. 6 describes information of ON or OFF of the first transistor Q1, information of ON or OFF of the second transistor Q2, and information of a case where a current flows (ON) or does not flow (OFF) in the string 2. In the upper part of each column of FIG. 6, ON or OFF of the first transistor Q1 and ON or OFF of the second transistor Q2 are described on both sides of the slash "/". In the lower part of each column, information on whether or not a current flows in the string 2 is described as ON (current flows) or OFF (current does not flow).

For example, when both the query Q and the key K are zero, the first transistor Q1 is ON and the second transistor Q2 is ON, and thus a current flows through the corresponding string 2 (ON). On the other hand, when the query Q is 1 and the key K is 0, since the first transistor Q1 is ON and the second transistor Q2 is OFF, no current flows through the corresponding string 2 (OFF).

As can be seen from FIG. 6, only when both the first transistor Q1 and the second transistor Q2 are turned on, a current flows through the corresponding string 2. Both the first transistor Q1 and the second transistor Q2 are turned on when both the query Q and the key K are 1 or when both the query Q and the key K are 0.

FIGS. 3, 4, and 6 illustrate an example in which each bit of the query Q and the key K is binary data, but comparison between binary data of each bit only enables simple comparison between binary data. In a recent nonvolatile memory, multi-valued data of three or more values can be stored in a memory cell, and a storage capacity of the nonvolatile memory is increased. By using such a nonvolatile memory capable of storing multi-valued data, the query Q and the key K can be compared even when the query Q and the key K are multi-valued data, and the application range of the information processing apparatus 1 according to the present embodiment can be expanded.

FIG. 7 is a diagram illustrating an example in which the query Q and the key K are multi-valued data. FIG. 7 illustrates an example in which the query Q and the key K are configured by four bits, and the four bits of the query Q are q0, q1, q2, and q3. Assuming that the key K is k00, k10, k20, k30, or k01, k11, k21, k31, or k02, k12, k22, k32, or k03, k13, k23, k33, comparison between the query Q and the key K for each bit is expressed by the following Expression (1).

$$\overline{MDi} = \sum_{j=0}^{n} \overline{qj \oplus kji} \qquad (1)$$

In Expression (1), an exclusive NOR (ExNOR) of the query Q and the key K is calculated for each bit, and a value /MDi obtained by adding the query Q and the key K for each bit is calculated. When the query Q and the key K are multi-valued data, an exclusive NOR is operated for each multi-valued data.

FIG. 8 is a diagram illustrating the first transistor Q1 and the second transistor Q2 in the string 2 when the query Q and the key K are 3-bit multi-valued data. In the case of FIG. 8, the query Q and the key K can take eight potential levels of 3 bit. The key K (the first threshold of the first transistor Q1) stored in the first transistor Q1 and the key /K (the second threshold of the second transistor Q2) stored in the second transistor Q2 have a complementary relationship, and when the first threshold of the first transistor Q1 is K, the second threshold of the second transistor Q2 is 7−K.

In the same manner, since the query Q input to the gate of the first transistor Q1 and the query /Q input to the gate of the second transistor Q2 have a complementary relationship, when the query Q input to the gate of the first transistor Q1 is Q, the query /Q input to the gate of the second transistor Q2 is represented by 7−Q.

FIG. 9 is a diagram illustrating a relationship between threshold values and gate voltages of the first transistor Q1 and the second transistor Q2. The first threshold of the first transistor Q1 in each string 2 is a value depending on the key K input via the bit line BL.

Since the voltage level of the threshold slightly varies for each transistor, the potential level of the first threshold of the first transistor Q1 varies within a predetermined range as illustrated in FIG. 9. This variation range is called a threshold distribution. The first transistor Q1 is turned on when the potential level of the query Q applied to the gate of the first transistor Q1 is larger than the threshold distribution, and is turned off when the potential level of the query Q is smaller than the threshold distribution. The same applies to the second transistor Q2.

From FIGS. 8 and 9, the first transistor Q1 and the second transistor Q2 are both turned on only when both the following Expressions (2) and (3) are satisfied.

$$Q \geq K \qquad (2)$$

$$7 - Q \geq 7 - K \qquad (3)$$

Expression (4) is obtained by modifying Expression (3).

$$Q \leq K \qquad (4)$$

A condition that satisfies both Expression (2) and Expression (4) is represented by Expression (5).

$$Q = K \qquad (5)$$

In this manner, the first transistor Q1 and the second transistor Q2 in each string 2 are turned on only when the multi-valued data of the query Q and the key K are matched. This relationship also applies to data other than 3 bits.

The first transistor Q1 and the second transistor Q2 in each of the plurality of transistor pairs 3 in the string 2 in FIG. 1 may store multi-valued data as illustrated in FIG. 8. Even when the first transistor Q1 and the second transistor Q2 store binary data or multi-valued data, a current flows through the string 2, and the voltage level of the bit line BL can be lowered only when the query Q and the key K of the first transistor Q1 and the second transistor Q2 in all the transistor pairs 3 in the string 2 in FIG. 1 are matched.

Figure 10A:
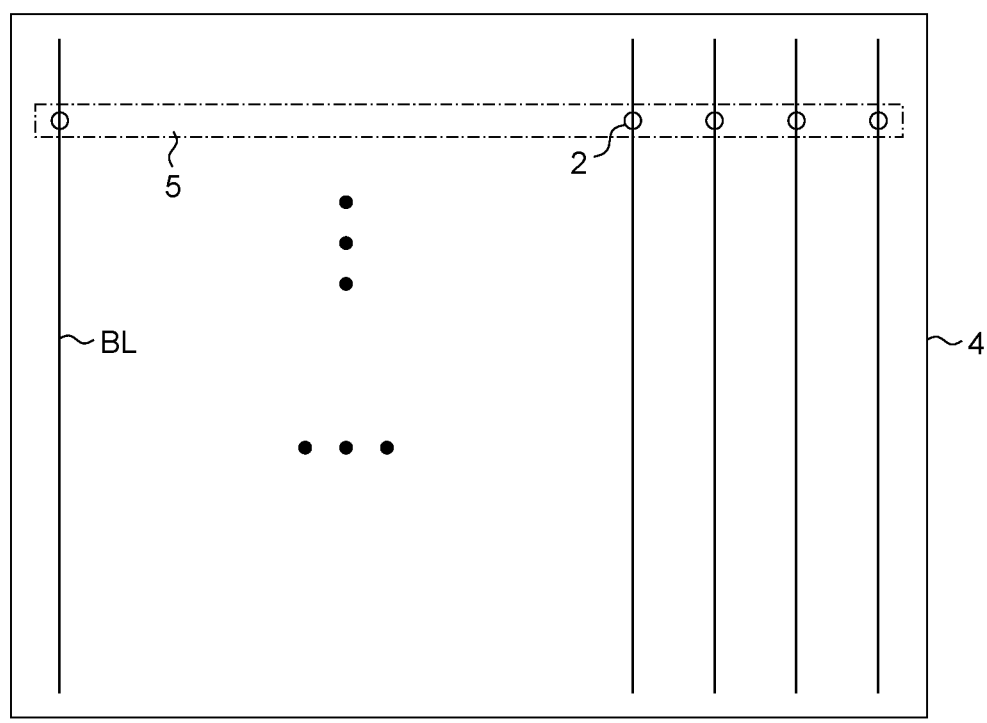
FIG. 10A is a schematic plan layout diagram of a memory cell array according to a first example in which one string is connected to each of a plurality of bit lines.

The information processing apparatus 1 of FIG. 1 can be configured using a memory cell array. FIG. 10A is a schematic plan layout diagram of a memory cell array 4 according to the first example in which one string 2 is connected to each of a plurality of bit lines BL. The circles in FIG. 10A represent the string 2 extending from the bit line BL to the back side of the paper surface. In the present specification, the plurality of strings 2 connected to the same word line group WL1 to WLn is referred to as a block 5.

Each string 2 connected to corresponding bit line BL separately perform match detection between the query Q and the key K. When match between the query Q and the key K is detected in all the transistors in one string 2, the voltage level of the bit line BL connected to this string 2 is lowered. Thus, monitoring the voltage level of the bit line BL makes it possible to detect whether or not the query Q and the key K are matched in all the transistors in the string 2.

Figure 10B:
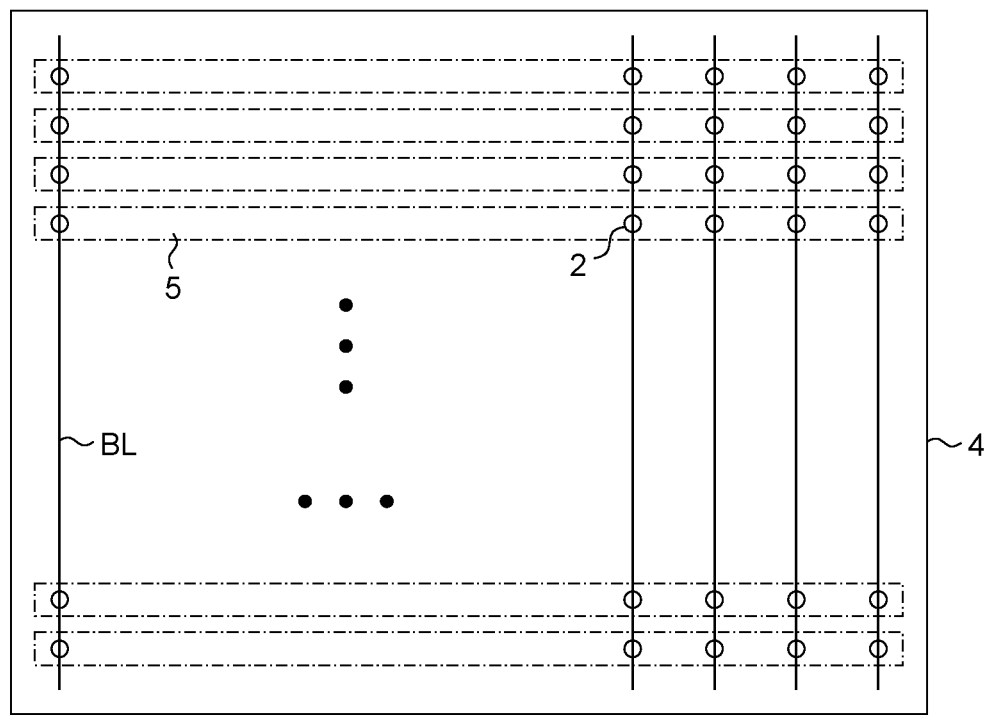
FIG. 10B is a schematic plan layout diagram of a memory cell array according to a second example in which a plurality of strings are connected to each of a plurality of bit lines.

FIG. 10B is a schematic plan layout diagram of the memory cell array 4 according to the second example in which the plurality of strings 2 are connected to each of the plurality of bit lines BL1 to BLn. In this case, as illustrated in FIG. 10B, a plurality of blocks 5 including different word lines WL1 to WLn are provided.

In FIG. 10B, the plurality of strings 2 are connected to each of the bit lines BL. Each string 2 lowers the voltage level of the bit line BL when the query Q and the key K of all transistors are matched. Thus, the voltage level of the bit line BL further decreases as the number of strings 2 in which the queries Q and the keys K of all the transistors are matched increases. Therefore, monitoring the voltage level of each bit line BL makes it possible to detect the number of strings 2 in which the queries Q and the keys K of all the transistors are matched.

The plurality of blocks 5 illustrated in FIG. 10B are not necessarily operated simultaneously, and may be operated with time shifted for each block 5.

Figure 10C:
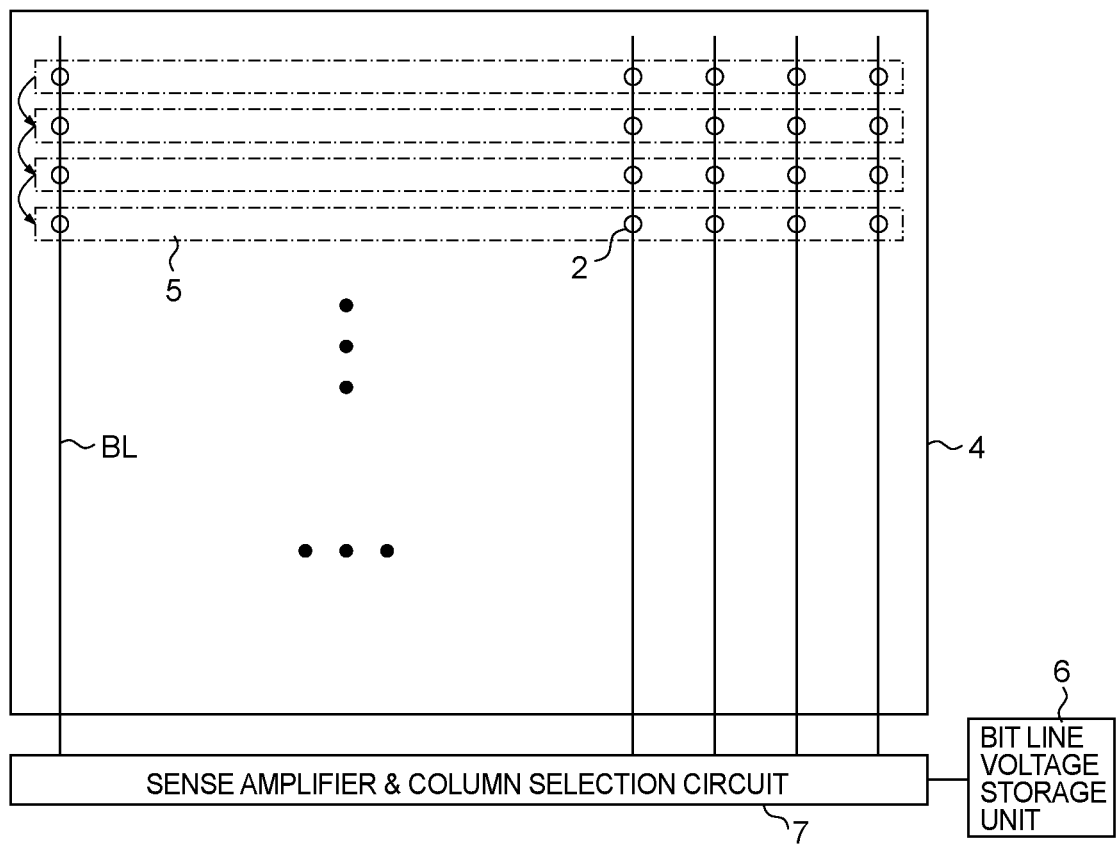
FIG. 10C is a schematic plan layout diagram of a memory cell array according to a third example in which a plurality of strings are connected to each of a plurality of bit lines.

FIG. 10C is a schematic plan layout diagram of the memory cell array 4 according to the third example in which the plurality of strings 2 are connected to each of the plurality of bit lines BL1 to BLn. In FIG. 10C, match detection of the query Q and the key K is performed in all the strings 2 in the block 5 in order with time shifted for each block 5, and the voltage level of the bit line BL to which the string 2 in which the query Q and the key K of all the transistors match is connected is stored in a bit line voltage storage unit 6. The bit line voltage storage unit 6 is connected to, for example, a sense amplifier & column selection circuit 7 that senses the bit line BL. The voltage level of the bit line BL stored in the bit line voltage storage unit 6 is overwritten when the match detection result for the new block 5 appears in the bit line BL.

In this manner, in the first embodiment, the plurality of transistor pairs 3 are provided in the string 2 connected to the bit line BL, and whether or not the first element of the first vector matches the second element of the second vector is detected in each transistor pair 3. Since the voltage level of the bit line BL is lowered only when all the first elements of the first vector match the corresponding second elements of the second vector, it is possible to simply and quickly detect whether or not all the first elements of the first vector match the corresponding second elements of the second vector with the voltage level of the bit line BL. This makes it possible to quickly detect comparison between two vectors having a large number of elements using the memory cell array 4.

Second Embodiment

In the information processing apparatus 1 of FIG. 1, the query Q for comparing with the key K is applied by the word lines WL1 to WLn and the word lines /WL1 to /WLn connected to the gates of the first transistor Q1 and the second transistor Q2 constituting each transistor pair 3 in the string 2. Since the voltage levels of the word lines WL1 to WLn and the word lines /WL1 to /WLn set when match detection between the query Q and the key K is performed are not so high, a channel is not sufficiently formed in the signal path connecting two adjacent transistor pairs 3 in the string 2 in FIG. 1, and as a result, an expected current does not flow in the string 2 in some cases even when the key K and the query Q are matched. When the expected current does not flow in the string 2, the voltage level of the bit line BL does not sufficiently decrease, and there is a possibility that the comparison result for each element of the first vector and the second vector cannot be correctly detected. An information processing apparatus 1 according to a second embodiment described below solves the above-described problem.

Figure 11:
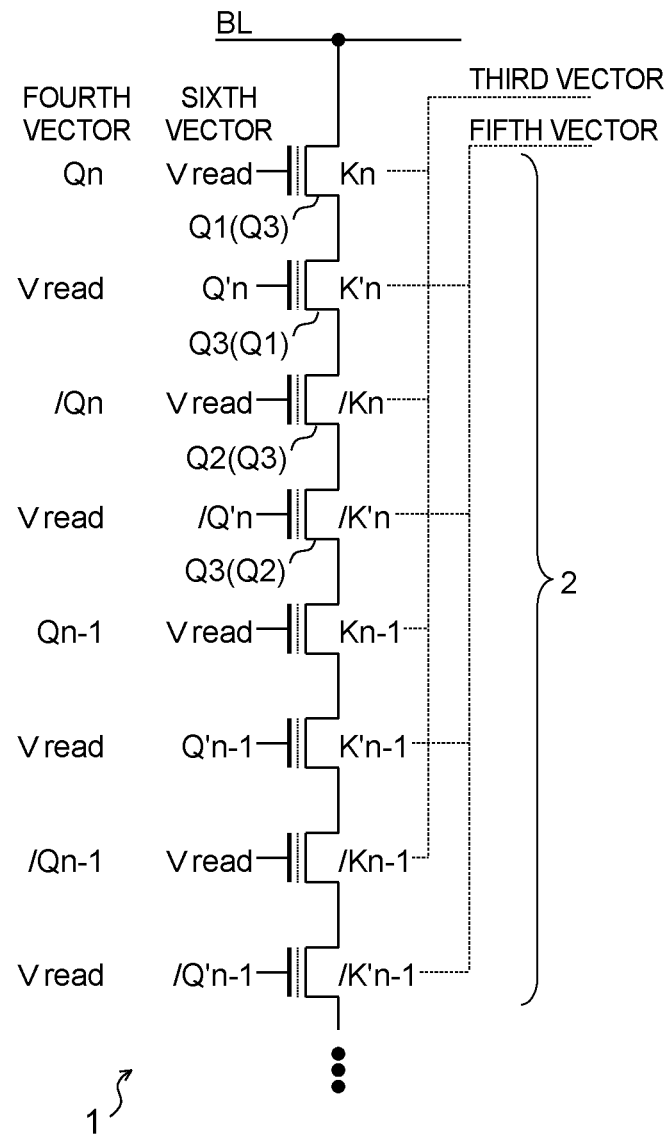
FIG. 11 is a circuit diagram of a main part of an information processing apparatus according to a second embodiment.

FIG. 11 is a circuit diagram of a main part of the information processing apparatus 1 according to the second embodiment. The information processing apparatus 1 of FIG. 11 is the same as that of FIG. 1 in including the string 2 having one end connected to the bit line BL, but the connection form of each transistor in the string 2 is different from that of the string 2 of FIG. 1.

In the string 2 in FIG. 11, the first transistor Q1 and the second transistor Q2 constituting each of the plurality of transistor pairs 3 connected in series along the current path of the string 2 are not disposed adjacent to each other, but are disposed with another transistor (hereinafter, referred to as a third transistor) Q3 interposed therebetween. For example, in the example of FIG. 11, the first transistor Q1 that comes first from the bit line BL side in the string 2 and the second transistor that comes third from the bit line BL side in the string 2 constitute one transistor pair 3. A voltage Vread, which is at a much higher voltage level than the voltage applied to the gates of the first and third transistors from the bit line BL side, is applied to the gate of the second transistor (third transistor Q3) from the bit line BL side in the string 2. Thus, the third transistor Q3 is reliably turned on.

As will be described later, each transistor in the string 2 alternately operates as the first transistor Q1 or the third transistor Q3 or alternately operates as the second transistor Q2 or the third transistor Q3 every time match detection is performed.

Connecting another third transistor Q3 whose gate is applied with Vread between the first transistor Q1 and the second transistor Q2 constituting the transistor pair 3 reliably forms a channel in the current path connecting the first transistor Q1 and the third transistor Q3 and the current path connecting the third transistor Q3 and the second transistor Q2. Thus, when match between the query Q and the key K is detected in each of the first transistor Q1 and the second transistor Q2 constituting the transistor pair 3, a stable current can flow from the drain of the first transistor Q1 to the source of the second transistor Q2 via the third transistor Q3.

In this manner, the string 2 of FIG. 11 is the same as the string 2 of FIG. 1 in that the plurality of transistor pairs 3 are connected in series along the current path, but the first transistor Q1 and the second transistor Q2 constituting each transistor pair 3 are not connected adjacent to each other along the current path, and the first transistor Q1 and the second transistor Q2 are connected in series across another third transistor Q3 to which Vread is applied at the gate.

In addition, in the information processing apparatus 1 according to the second embodiment, the two vectors are alternately compared using different transistor pairs 3 in the string 2. Hereinafter, an example in which the first vector has a third vector and a fourth vector each including a plurality of first elements, and the second vector has a fifth vector and a sixth vector each including a plurality of first elements will be described.

In the string 2 of FIG. 11, by using a plurality of transistors connected in series along a current path in the string 2, match detection between the plurality of first elements in the third vector and the plurality of second elements in the fifth vector and match detection between the plurality of first elements in the fourth vector and the plurality of second elements in the sixth vector are alternately performed.

For example, match detection for each element of the third vector and the fifth vector is performed by using a plurality of transistor pairs 3 each including the first transistor Q1 and the second transistor Q2 disposed in odd-numbered order from the bit line BL side, including the transistor pair 3 including the first transistor Q1 that comes first and the second transistor Q2 that comes third from the bit line BL side of FIG. 11. In this case, Vread is applied to the gates of the respective transistors disposed in even-numbered order from the bit line BL side in the string 2.

Match detection for each element of the fourth vector and the sixth vector is performed using the plurality of transistor pairs 3 each including the first transistor Q1 and the second transistor Q2 disposed in even-numbered order from the bit line BL side, including the transistor pair 3 including the first transistor Q1 that comes second and the second transistor Q2 that comes fourth from the bit line BL side in FIG. 11. In this case, Vread is applied to the gates of the respective transistors disposed in odd-numbered order from the bit line BL side in the string 2.

In this manner, the voltage depending on the query Q and Vread are alternately applied to the gate of each transistor in the string 2 of FIG. 11. That is, match detection of the query Q and the key K using two or more transistors connected in odd-numbered order from the top among the plurality of transistors in the string 2 and match detection of the query Q and the key K using two or more transistors connected in even-numbered order from the top are alternately performed. When the match detection of the query Q and the key K using two or more transistors connected in odd-numbered order from the top is performed, Vread is applied to each gate of two or more transistors connected in even-numbered order from the top. When match detection between the query Q and the key K using two or more transistors connected in even-numbered order from the top is performed, Vread is applied to each gate of two or more transistors connected in odd-numbered order from the top.

Figure 12:
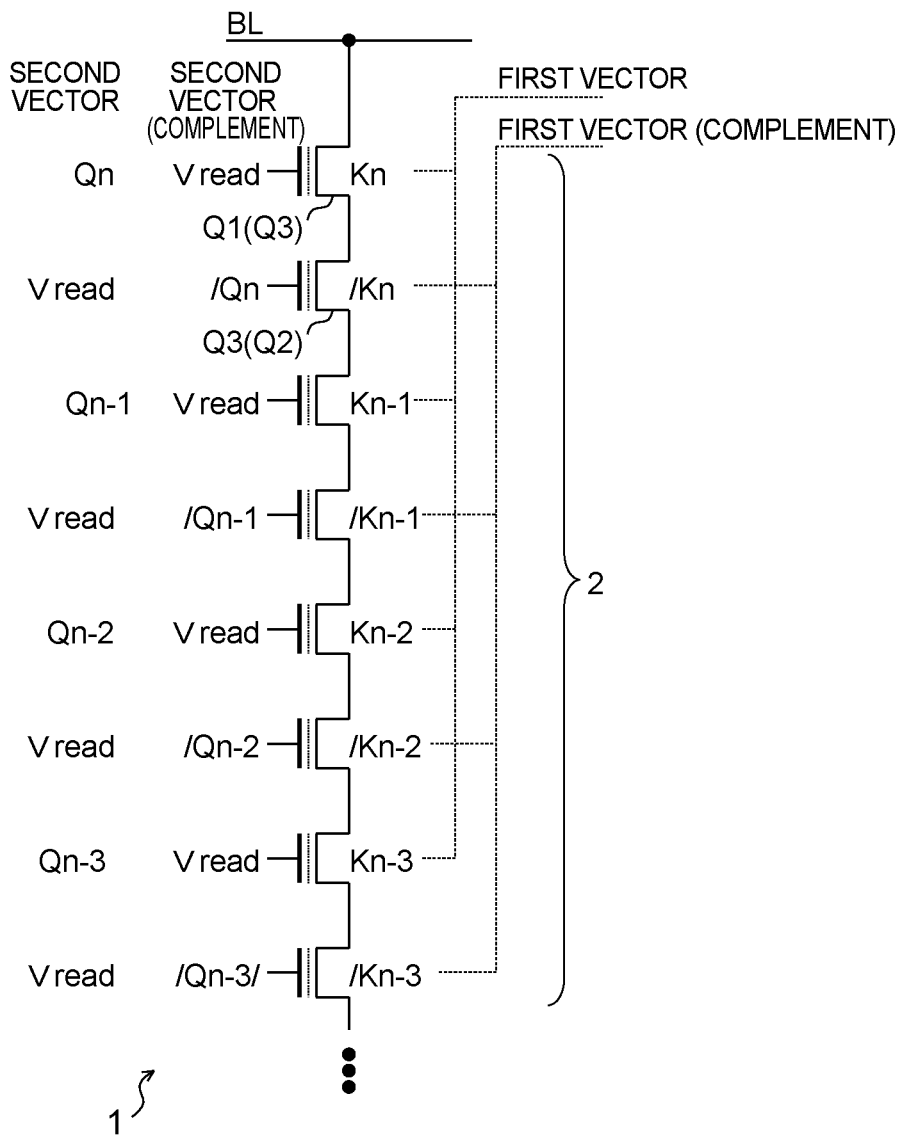
FIG. 12 is a circuit diagram of an information processing apparatus according to a modification of FIG. 11.

FIG. 12 is a circuit diagram of the information processing apparatus 1 according to a modification of FIG. 11. The information processing apparatus 1 of FIG. 12 is different from the information processing apparatus 1 of FIG. 11 in the configuration of the string 2.

A voltage depending on third data representing a plurality of second elements of the second vector and a voltage depending on fourth data which is complement data of the third data of the second vector are alternately input to the gate of each transistor in the string 2 of FIG. 12.

More specifically, the string 2 alternately performs a first operation of comparing the first data related to the first vector with the third data related to the second vector, and a second operation of comparing the second data related to the first vector with the fourth data related to the second vector.

In the first operation, the first threshold depending on the first data representing the plurality of first elements of the first vector is set to the first transistor group including two or more transistors connected in order from the side close to the first wiring in odd-numbered order among the plurality of transistors connected in series along the current path in the string 2, the voltage depending on the third data representing the plurality of second elements of the second vector is applied to the gate of each transistor constituting the first transistor group, and the voltage Vread at a predetermined voltage level larger than the voltage depending on the third data is applied to the gate of each transistor connected in even-numbered order from the side close to the first wiring.

In the second operation, the second threshold depending on the second data that is the complement data of the first data of the first vector is set to the second transistor group including two or more transistors connected in order from the side close to the first wiring in even-numbered order among the plurality of transistors connected in series along the current path in the string 2, the voltage depending on the fourth data which is the complement data of the third data of the second vector is applied to the gate of each transistor constituting the second transistor group, and the voltage Vread at a predetermined voltage level larger than the voltage depending on the fourth data is applied to the gate of each transistor connected in odd-numbered order from the side close to the first wiring.

For example, in the NAND flash memory cell array 4, the voltage Vread is substantially the same as the voltage applied to the gate of the memory cell transistor not to be read when the memory cell transistor to be read in the string 2 is read.

In FIG. 12, an example is illustrated in which the gate voltages of the plurality of transistors in the string 2 are divided into two times and applied with shifted time, but the plurality of transistors disposed along the current path of the string 2 may be divided into a plurality of transistor groups and the gate voltage may be applied with shifted time for each transistor group. In this manner, the time may be shifted to three or more times until the application of the gate voltages of all the transistors in the string 2 is completed.

Also in the information processing apparatus 1 according to the second embodiment, one string 2 may be connected to each of the plurality of bit lines BL as illustrated in FIG. 10A, a plurality of strings 2 may be connected to each of the plurality of bit lines BL1 to BLn as illustrated in FIG. 10B, or match detection may be performed by shifting the time for each of the plurality of blocks 5 as illustrated in FIG. 10C.

In this manner, in the second embodiment, the plurality of transistors in the string 2 are divided into a transistor group connected in odd-numbered order and a transistor group connected in even-numbered order from the bit line BL side, and match detection of the query Q and the key K is alternately performed while shifting the time. Then, when match detection of the transistor group connected in odd-numbered order is performed, a voltage Vread much higher than the voltage depending on the third data or the fourth data of the query Q is applied to the gates of the transistors connected in even-numbered order. In the same manner, when the match detection of the transistor group connected in even-numbered order is performed, the voltage Vread is applied to the gate of the transistor connected in odd-numbered order. As a result, a channel is reliably formed in a current path connecting two adjacent transistors in the string 2, and variation in current flowing through the string 2 can be suppressed.

Third Embodiment

Figure 13A:
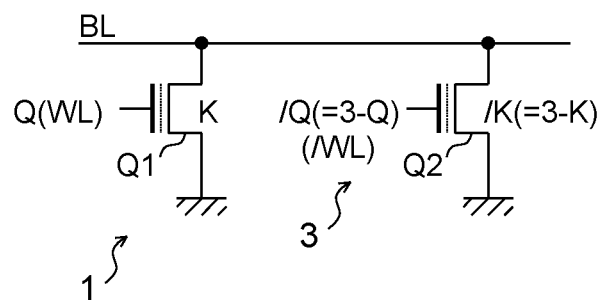
FIG. 13A is a circuit diagram of a main part of an information processing apparatus according to a third embodiment.

FIG. 13A is a circuit diagram of a main part of the information processing apparatus 1 according to a third embodiment. The information processing apparatus 1 of FIG. 13A includes the first transistor Q1 and the second transistor Q2 having one ends respectively connected to bit lines (first wiring lines) BL. Although the conductivity types of the first transistor Q1 and the second transistor Q2 are not limited, an example in which both the first transistor Q1 and the second transistor Q2 are N-type MOS transistors will be described below. The drain of the first transistor Q1 and the drain of the second transistor Q2 are connected to the bit line BL, and the source of the first transistor Q1 and the source of the second transistor Q2 are connected to a reference voltage node (for example, a ground node).

A voltage depending on the query Q (third data) is applied to the gate WL of the first transistor Q1. A voltage depending on the complement data (fourth data) of the query Q is applied to the gate /WL of the second transistor Q2. The first transistor Q1 is set to a threshold depending on the key K (first data). The second transistor Q2 is set to a threshold depending on the complement data (second data) of the key K.

The condition in which both the first transistor Q1 and the second transistor Q2 in FIG. 13A are turned off is a case where both the following Expressions (6) and (7) are satisfied. It is assumed that the first transistor Q1 and the second transistor Q2 can store 2-bit data.

$$Q \leq K \quad (6)$$

$$3 - Q \leq 3 - K \quad (7)$$

A condition that satisfies both Expression (6) and Expression (7) is expressed by the following Expression (8).

$$Q = K \quad (8)$$

As shown in Expression (8), in the information processing apparatus 1 of FIG. 13A, only when the query Q and the key K are matched, both the first transistor Q1 and the second transistor Q2 are turned off. This relationship also applies to data other than 2-bit data. When both the first transistor Q1 and the second transistor Q2 are turned off, the voltage level of the bit line BL is raised.

Figure 13B:
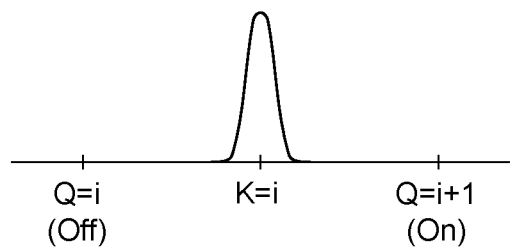
FIG. 13B is a diagram illustrating a threshold distribution of the first transistor of FIG. 13A.

FIG. 13B is a diagram illustrating a threshold distribution of the first transistor Q1 in FIG. 13A. As illustrated, the first transistor Q1 has a threshold distribution corresponding to the key K. When a voltage higher than the voltage level i of the center value of the threshold distribution is applied to the gate of the first transistor Q1, the first transistor Q1 is turned on, and when a voltage equal to or lower than the voltage level i of the center value of the threshold distribution is applied to the gate of the first transistor Q1, the first transistor Q1 is turned off.

FIG. 14 is a diagram illustrating a correspondence relationship between the key K (first data) in FIG. 13A and FIG. 13B, the first threshold of the first transistor Q1, and the second threshold of the second transistor Q2. In the example of FIG. 14, the key K is 1-bit binary data.

As illustrated in FIG. 14, when the key K is 0, the first threshold of the first transistor Q1 is set to Vth_low, and the second threshold of the second transistor Q2 is set to Vth_high. When the key K is 1, the first threshold of the first transistor Q1 is set to Vth_high, and the second threshold of the second transistor Q2 is set to Vth_low. Vth_high is a potential level higher than Vth_low. When the key K is X, the first threshold of the first transistor Q1 and the second threshold of the second transistor Q2 are both Vth_low. X corresponds to a case of don't care or indefinite.

In this manner, when the key K (first data) is 1, the first threshold of the first transistor Q1 is larger than that when the key K is 0. In the same manner, when the key /K (second data) is 1, the second threshold of the second transistor Q2 is larger than that when the key /K is 0.

FIG. 15 is a diagram illustrating a correspondence relationship between bit information and a potential level of the query Q (third data) applied to the gates of the first transistor Q1 and the second transistor Q2 via the word lines WL and /WL. The query Q has a number of bits of 1 bit or more. FIG. 15 illustrates an example in which the query Q takes a binary value (0 or 1). A voltage depending on the third data of the query Q is applied to the gate of the first transistor Q1. A voltage depending on fourth data that is complement data of the third data is applied to the gate of the second transistor Q2.

As illustrated in FIG. 15, when the query Q is 0, the voltage (third data) of the voltage level Vcgr1 is applied to the gate of the first transistor Q1, and the voltage (fourth data) of the voltage level Vcgr2 is applied to the gate of the second transistor Q2. When the query Q is 1, the voltage (third data) of the voltage level Vcgr2 is applied to the gate of the first transistor Q1, and the voltage (fourth data) of the voltage level Vcgr1 is applied to the gate of the second transistor Q2. As shown in FIG. 15, Vcgr2>Vcgr1 works.

In this manner, the word lines WL and /WL connected to the gates of the first transistor Q1 and the second transistor Q2 are at the potential level of Vcgr1 or Vcgr2. When the query Q is X, both the word lines WL and /WL connected to the gates of the first transistor Q1 and the second transistor Q2 are set to Vcgr1. X corresponds to a case of don't care or indefinite.

Figure 16A:
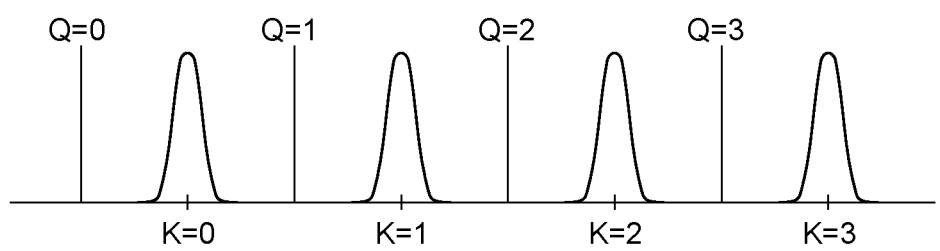
FIG. 16A is a diagram illustrating a threshold distribution of the first transistor of FIG. 13A when the first transistor stores 2-bit data.

FIG. 16A is a diagram illustrating a threshold distribution of the first transistor Q1 when the first transistor Q1 in FIG. 13A stores 2-bit data. As illustrated in FIG. 16A, different threshold distributions are formed depending on the value of the key K of the first transistor Q1. The condition in which the first transistor Q1 is turned off is when Q≤K, and when the gate voltage depending on the query Q is equal to or lower than the threshold voltage depending on the key K.

Figure 16B:
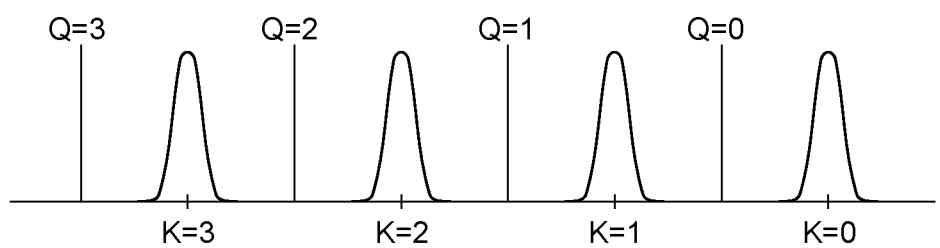
FIG. 16B is a diagram illustrating a threshold distribution of the second transistor of FIG. 13A.

FIG. 16B is a diagram illustrating a threshold distribution of the second transistor Q2 in FIG. 13A. As illustrated in FIG. 16B, in the second transistor Q2, different threshold distributions are formed depending on the value of 3−K. The condition in which the second transistor Q2 is turned off is when 3−Q≤3−K, and when the gate voltage depending on the query Q is equal to or higher than the threshold voltage depending on the key K.

Figure 17A:
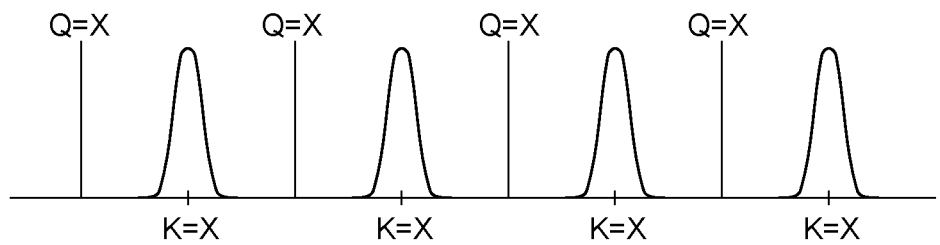
FIG. 17A is a diagram illustrating a relationship between a threshold distribution and a gate voltage when a query Q and a key K of the first transistor are X.
Figure 17B:
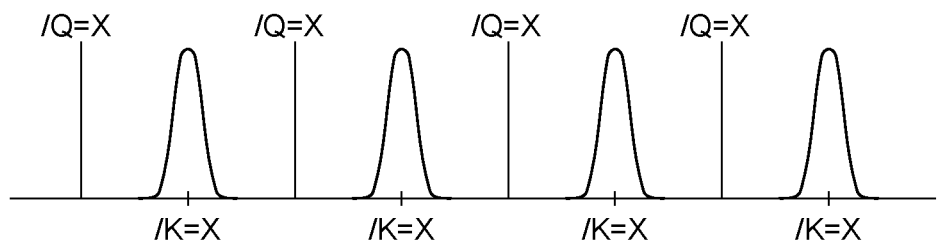
FIG. 17B is a diagram illustrating a relationship between a threshold distribution and a gate voltage when a query /Q and a key /K of the second transistor are X.

FIG. 17A is a diagram illustrating a relationship between the threshold distribution and the gate voltage when the query Q and the key K of the first transistor Q1 are X (don't care or indefinite), and FIG. 17B is a diagram illustrating a relationship between the threshold distribution and the gate voltage when the query /Q and the key /K of the second transistor Q2 are X (don't care or indefinite).

As illustrated in FIG. 17A, when the query Q and the key K are X, the gate voltage is set to a voltage level lower than the threshold distribution of the first transistor Q1, and the first transistor Q1 is turned off. The same applies to FIG. 17B, and when the query /Q and the key /K are X, the gate voltage is set to a voltage level lower than the threshold distribution of the second transistor Q2, and the second transistor Q2 is turned off.

Figure 18A:
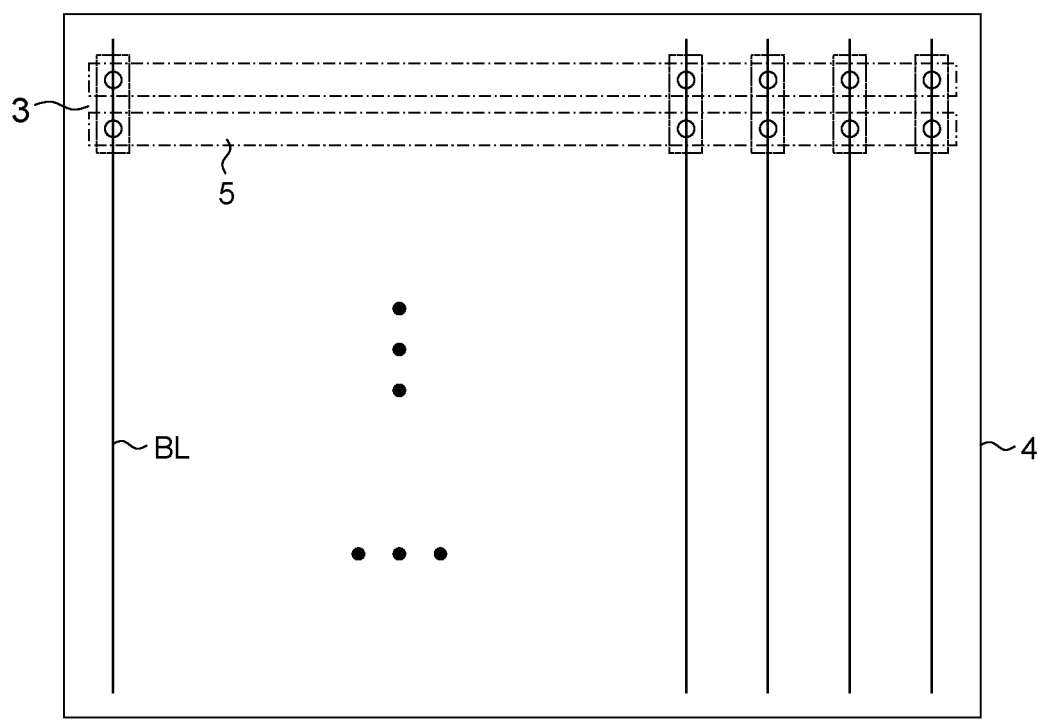
FIG. 18A is a schematic plan layout diagram of a memory cell array according to the first example included in an information processing apparatus according to a third embodiment.

FIG. 18A is a schematic plan layout diagram of the memory cell array 4 according to the first example included in the information processing apparatus 1 according to the third embodiment. In FIG. 18A, one end of each of the first transistor Q1 and the second transistor Q2 is connected to each of the plurality of bit lines BL1 to BLn. In each bit line BL, when both the first transistor Q1 and the second transistor Q2 are turned off, the voltage level of the corresponding bit line BL is raised. Thus, monitoring the voltage level of each bit line BL makes it possible to detect whether or not both the first transistor Q1 and the second transistor Q2 are turned off. In FIG. 18A, a plurality of transistor groups connected to the same word line groups WL1 to WLn are referred to as the block 5. Each transistor group includes the first transistor Q1 and the second transistor Q2.

Figure 18B:
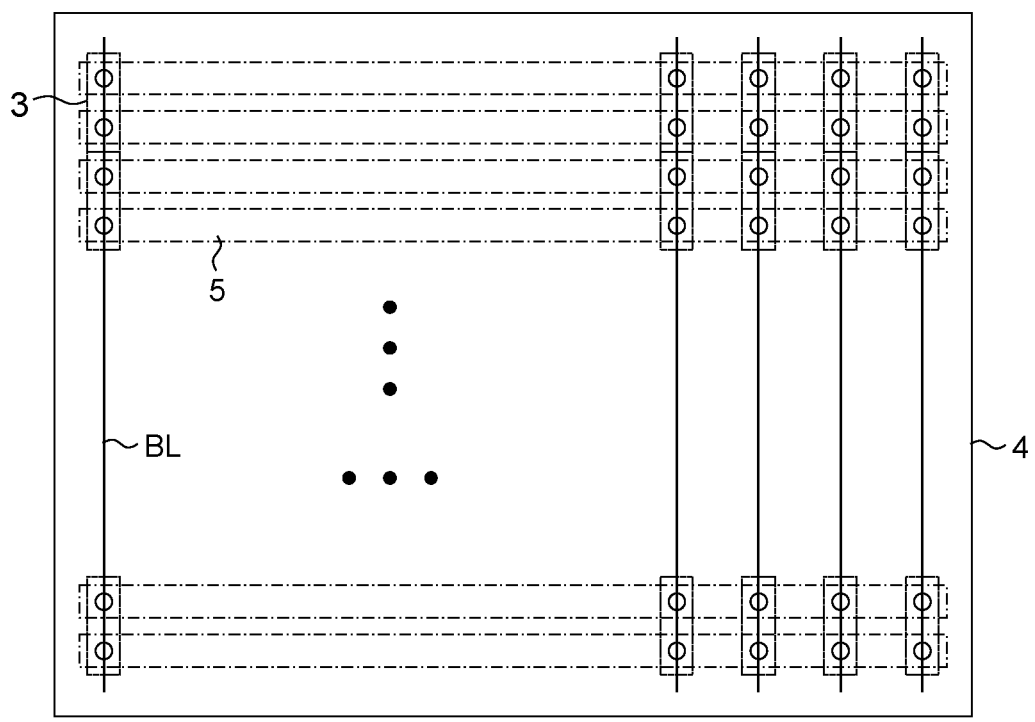
FIG. 18B is a schematic plan layout diagram of the memory cell array according to the second example.

FIG. 18B is a schematic plan layout diagram of the memory cell array 4 according to the second example. In FIG. 18B, a plurality of blocks 5 disposed in the bit line BL direction are included. As the number of transistor groups in which both the first transistor Q1 and the second transistor Q2 are turned off increases among the plurality of transistor groups connected to each bit line BL, the voltage level of the bit line BL rises.

Figure 18C:
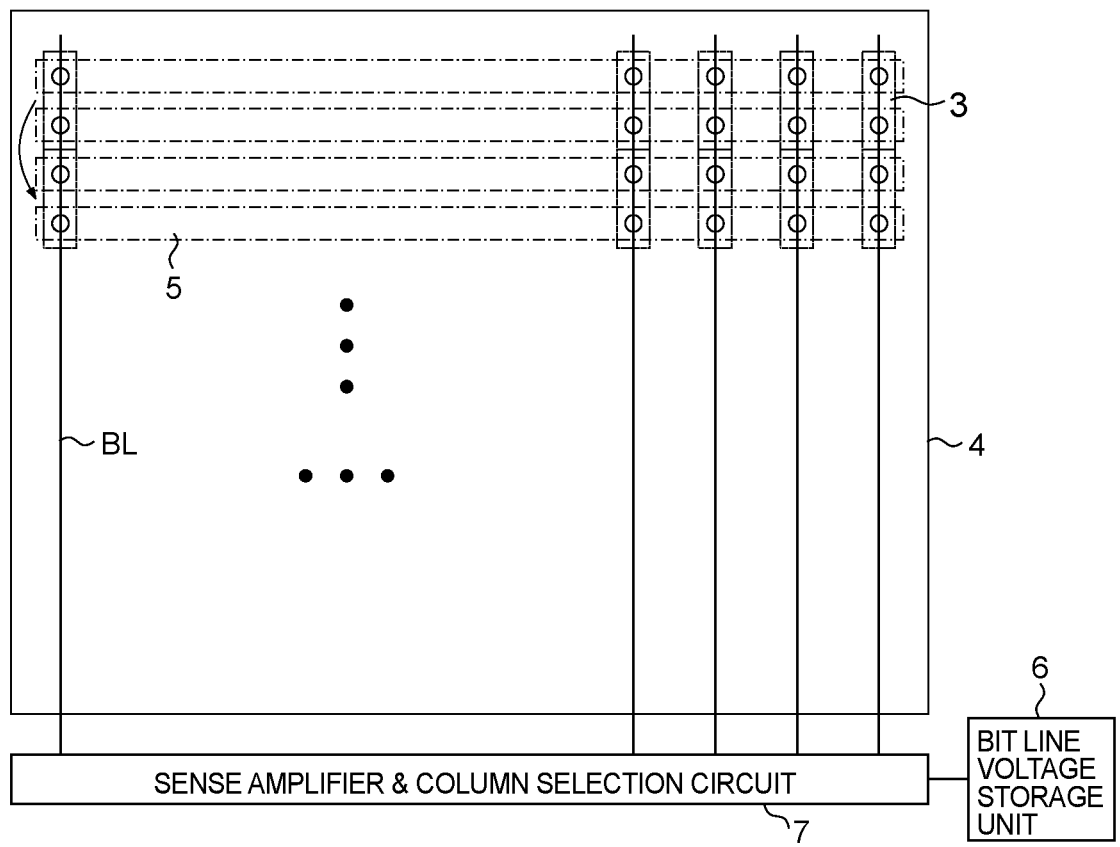
FIG. 18C is a schematic plan layout diagram of the memory cell array according to the third example.

FIG. 18C is a schematic plan layout diagram of the memory cell array 4 according to the third example. The memory cell array 4 of FIG. 18C includes a plurality of blocks 5 connected in the plurality of bit lines BL1 to BLn directions as in FIG. 18B, and each block 5 includes a transistor group including the first transistor Q1 and the second transistor Q2 for each bit line BL.

In the memory cell array 4 of FIG. 18C, each block 5 operates with time shifted. Thus, when both the first transistor Q1 and the second transistor Q2 connected to each bit line BL in one block 5 are turned off, the voltage level of the bit line BL is raised. The voltage level of the bit line BL is stored in, for example, the bit line voltage storage unit 6 connected to the sense amplifier & column selection circuit 7. Each time the first transistor Q1 and the second transistor Q2 connected to each bit line BL in each block 5 are both turned off, the voltage level stored in the bit line voltage storage unit 6 is updated.

In this manner, in the third embodiment, since the first transistor Q1 and the second transistor Q2 of which one ends are connected to the bit line BL, when the voltage level of the bit line BL is raised, it can be determined that both the first transistor Q1 and the second transistor Q2 are turned off. Thus, monitoring the bit line BL makes it possible to simply and quickly detect that both the first transistor Q1 and the second transistor Q2 are turned off.

Fourth Embodiment

A fourth embodiment is characterized by performing similarity search.

Figure 19:
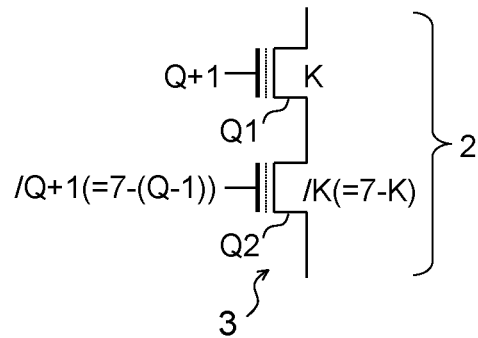
FIG. 19 is a circuit diagram of an information processing apparatus capable of performing similarity search.

FIG. 19 is a circuit diagram of the information processing apparatus 1 capable of performing similarity search. The information processing apparatus 1 of FIG. 19 includes the string 2 having one end connected to the bit line BL. The other end of the string 2 is connected to, for example, a reference voltage node (for example, a ground node). The string 2 includes the first transistor Q1 and the second transistor Q2 connected in series along a current path. FIG. 19 illustrates an example in which the first transistor Q1 and the second transistor Q2 can store 3-bit data, but the number of bits stored by the first transistor Q1 and the second transistor Q2 is not limited.

A voltage higher by a voltage corresponding to one unit of the query than the voltage depending on the third data representing the query Q is applied to the gate of the first transistor Q1. The first transistor Q1 has a threshold depending on the first data representing the key K. A voltage by a voltage corresponding to one unit of the query higher than the voltage depending on the fourth data representing the complement data of the query Q is applied to the gate of the second transistor Q2. The second transistor Q2 has a threshold depending on the second data representing the complement data of the key K.

The condition in which both the first transistor Q1 and the second transistor Q2 in FIG. 19 are turned on is a case where both the conditions of the following Expressions (9) and (10) are satisfied.

$$Q + 1 \geq K \quad (9)$$

$$7 - (Q - 1) \geq 7 - K \quad (10)$$

A condition that satisfies both Expression (9) and Expression (10) is represented by Expression (11).

$$Q - 1 \leq K \leq Q + 1 \quad (11)$$

Figure 20:
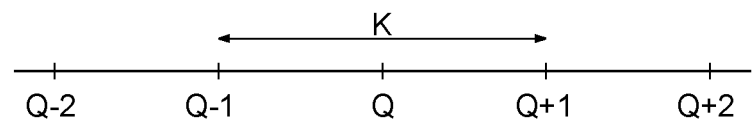
FIG. 20 is a diagram for describing a relationship between a query Q and a key K in Expression (11)

FIG. 20 is a diagram for describing the relationship between the query Q and the key K in Expression (11). As illustrated in FIG. 20, a current flows through the string 2 in FIG. 19, and the voltage level of the bit line BL is lowered as long as the absolute value of the difference between the query Q and the key K is 1 or less, even when the query Q and the key K are not necessarily matched. Thus, it can be determined that the query Q and the key K are similar when the bit line BL is monitored and the voltage of the bit line BL is lowered. Detecting whether or not the query Q and the key K are similar in this manner is referred to as similarity search in the present specification.

Figure 21:
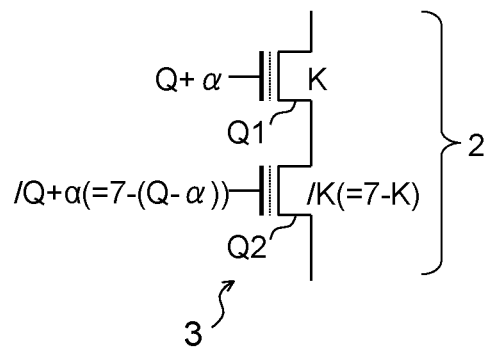
FIG. 21 is a circuit diagram in which a similarity search range is generalized.

FIG. 21 is a circuit diagram in which a similarity search range is generalized. A voltage higher by a voltage corresponding to the α unit of the query than the voltage depending on the third data representing the query Q is applied to the gate of the first transistor Q1 in the string 2 of FIG. 21. A voltage higher by a voltage corresponding to the α unit of the query than the voltage depending on the fourth data representing the complement data of the query Q is applied to the gate of the second transistor Q2 in the string 2 of FIG. 21. α is any real number.

The condition in which both the first transistor Q1 and the second transistor Q2 in FIG. 21 are turned on is a case where both the conditions of the following Expressions (12) and (13) are satisfied.

$$Q + a \geq K \quad (12)$$

$$7 - (Q - a) \geq 7 - K \quad (13)$$

A condition that satisfies both Expression (12) and Expression (13) is represented by Expression (14).

$$Q - a \leq K \leq Q + a \quad (14)$$

As shown in Expression (14), when the absolute value of the difference between the query Q and the key K is equal to or less than a, it is determined that the query Q and the key K are similar to each other, and the voltage level of the bit line BL is lowered.

Figure 22:
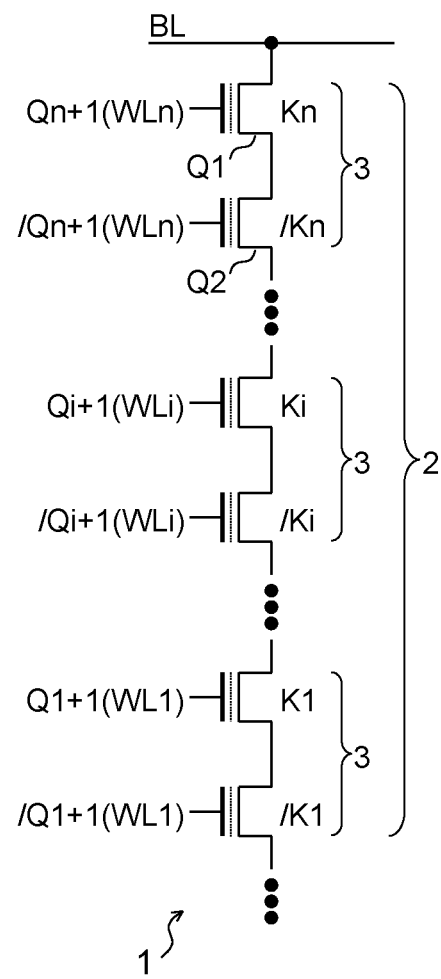
FIG. 22 is a circuit diagram of an information processing apparatus according to a fourth embodiment.

FIG. 22 is a circuit diagram of the information processing apparatus 1 according to the fourth embodiment. The information processing apparatus 1 of FIG. 22 includes the string 2 having one end connected to the bit line BL. The string 2 includes a plurality of transistor pairs 3 connected in series along a current path. Each transistor pair 3 includes the first transistor Q1 and the second transistor Q2 connected in series along the current path as in FIG. 19.

The information processing apparatus 1 of FIG. 22 searches whether or not the corresponding first element and second element are matched or are similar between the first vector having the plurality of first elements and the second vector having the plurality of second elements, and lowers the voltage of the bit line BL according to the transistor pair 3 having the lowest degree of similarity when all of the corresponding first element and second element are matched or are similar.

FIG. 22 shows an example in which n transistor pairs 3 connected in series are provided along the current path in the string 2. The value of n is any integer of 1 or more.

As shown in Expression (11), the first transistor Q1 and the second transistor Q2 constituting each transistor pair 3 in the string 2 are both turned on when the absolute value of the difference between the query Q and the key K is 1 or less.

In each of the n transistor pairs 3, the maximum current amount that can flow to the first transistor Q1 and the second transistor Q2 differs depending on the degree of similarity between the query Q and the key K. Specifically, the more similar the query Q and the key K, the greater the maximum current amount. However, since the plurality of transistor pairs 3 are connected in series in the string 2 of FIG. 22, the current flowing through the string 2 is limited by the maximum current amount flowing through the transistor pair 3 having the lowest degree of similarity among the plurality of transistor pairs 3. This is expressed by Expressions (15) and (16).

$$D = \max_i(|Qi - Ki|) \qquad (15)$$

$$= \lim_{k \to \infty} \left( \sum_{i=1}^{n} |Qi - Ki|^k \right)^{\frac{1}{k}} \qquad (16)$$

Expression (16) is an expression obtained by adding the degree of similarity between the query Q and the key K in each transistor pair 3 in the string 2 in FIG. 22. Expression (15) is an expression representing the degree of similarity of the transistor pair 3 having the lowest degree of similarity between the query Q and the key K among the plurality of transistor pairs 3 in the string 2.

As can be seen from Expressions (15) and (16), the current flowing through the plurality of transistor pairs 3 connected in series in the string 2 is determined by the current flowing through the transistor pair 3 having the lowest degree of similarity between the query Q and the key K.

In this manner, when the similarity between the corresponding first element and second element is compared between the first vector having the plurality of first elements and the second vector having the plurality of second elements, the current flowing in the string 2 and the voltage level of the bit line BL are determined by the first element and the second element having the lowest degree of similarity.

Figure 23:
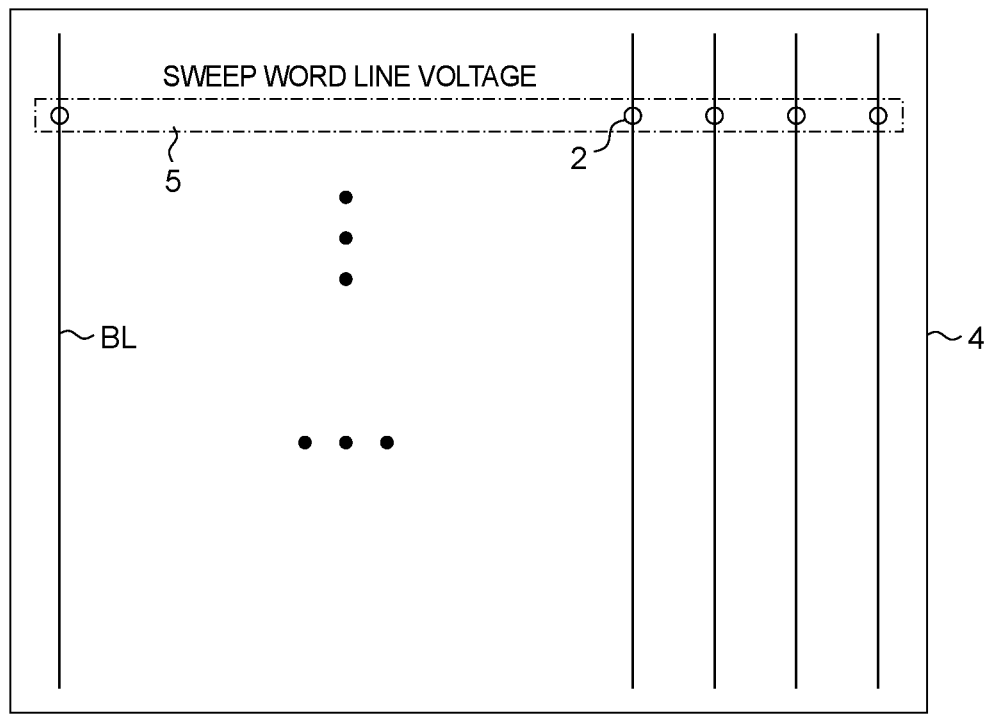
FIG. 23 is a plan layout diagram of a memory cell array included in the information processing apparatus according to the fourth embodiment.

FIG. 23 is a plan layout diagram of the memory cell array 4 included in the information processing apparatus 1 according to the fourth embodiment. The memory cell array 4 of FIG. 23 has a plurality of strings 2 connected to a plurality of bit lines BL. Each string 2 is configured in the same manner as in FIG. 22, and extends from the front surface side to the back surface side of the paper surface of FIG. 23.

In all the transistor pairs 3 in the string 2, when the corresponding first and second elements match each other or are similar to each other, the current flowing through the string 2 is determined by the transistor pair 3 having the lowest degree of similarity. Among the plurality of strings 2 in the block 5 illustrated in FIG. 23, the string 2 having the largest flowing current lowers the voltage level of the bit line BL earliest.

Thus, the plurality of bit lines BL in FIG. 23 can be monitored during the sweep operation period in which the query variation a is continuously or stepwise changed with α=0 as the initial value, and it can be determined that the string 2 connected to the bit line BL whose voltage level has dropped the earliest has the highest degree of similarity.

In this manner, when the similarity search for the first vector and the second vector is simultaneously performed in each of the plurality of strings 2 connected to the plurality of bit lines BL, it can be seen that the degree of similarity between the first vector and the second vector is the highest in the string 2 connected to the bit line BL in which the voltage level decreases the earliest. The configuration of the information processing apparatus 1 of FIG. 11 or 12 can be used instead of the configuration of the information processing apparatus 1 of FIG. 22.

Figure 24:
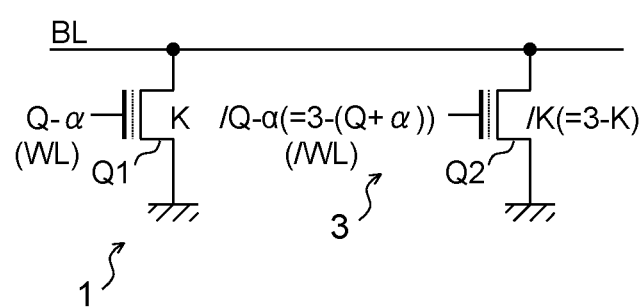
FIG. 24 is a circuit diagram of a main part of an information processing apparatus according to a modification of the fourth embodiment.

FIG. 24 is a circuit diagram of a main part of an information processing apparatus 1 according to a modification of the fourth embodiment. The information processing apparatus 1 of FIG. 24 includes the first transistor Q1 and the second transistor Q2 having one ends respectively connected to the bit line BL as in FIG. 13A. In FIG. 13A, the voltage depending on the query Q is applied to the gate of the first transistor Q1, but in FIG. 24, a voltage lower by a voltage corresponding to the α unit of the query than the voltage depending on the query Q is applied to the gate of the first transistor Q1. In the same manner, a voltage lower by a voltage corresponding to the α unit of the query than the voltage depending on the complement data of the query Q is applied to the gate of the second transistor Q2. The first transistor Q1 and the second transistor Q2 in FIG. 24 store, for example, 2-bit data.

In the information processing apparatus 1 of FIG. 24, the condition in which both the first transistor Q1 and the second transistor Q2 are turned off is a case where both the following Expressions (17) and (18) are satisfied.

$$Q - a \le K \qquad (17)$$

$$3 - (Q + a) \le 3 - K \qquad (18)$$

A condition that satisfies both Expression (17) and Expression (18) is represented by Expression (19).

$$Q - a \le K \le Q + a \qquad (19)$$

Figure 25A:
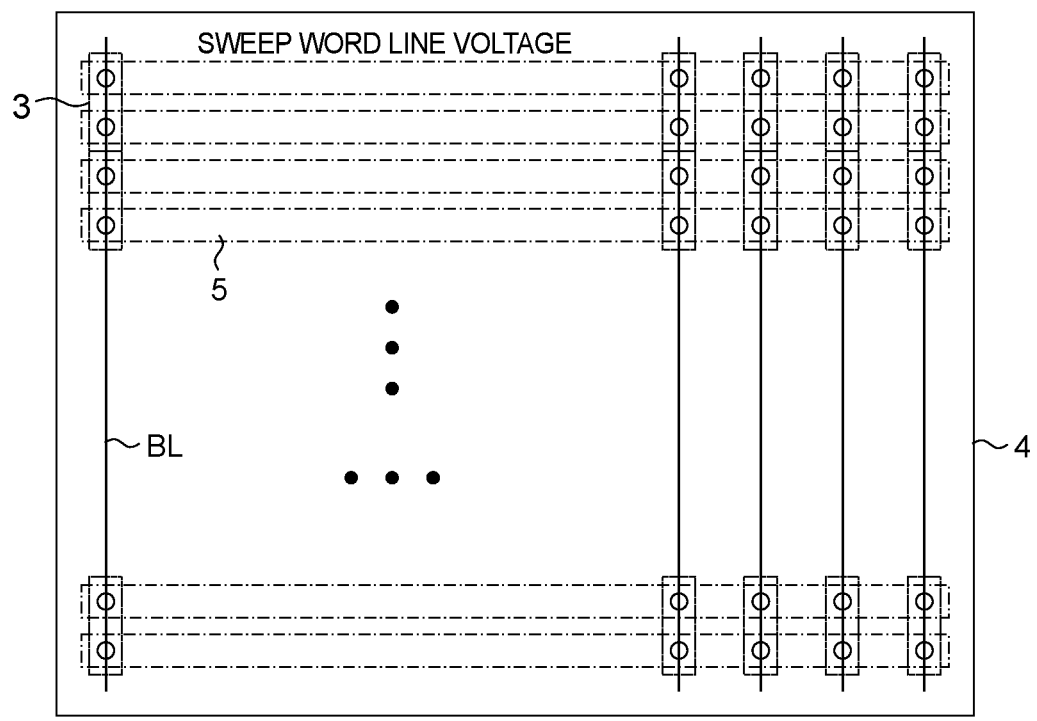
FIG. 25A is a plan layout diagram of the first example of a memory cell array included in the information processing apparatus of FIG. 24.

FIG. 25A is a plan layout diagram of the first example of the memory cell array 4 included in the information processing apparatus 1 of FIG. 24. The memory cell array 4 of FIG. 25A includes a block 5 connected to a plurality of bit lines BL. A transistor pair 3 including the first transistor Q1 and the second transistor Q2 is disposed at each location where the block 5 intersects the plurality of bit lines BL. In this manner, the block 5 includes the plurality of transistor pairs 3 connected to the plurality of bit lines BL. Each transistor pair 3 has two word lines WL and /WL.

In the block 5 of FIG. 25A, it can be detected that all of the corresponding first and second elements are matched or are similar to each other between the first vector including the plurality of first elements and the second vector including the plurality of second elements.

Each of the plurality of first elements of the first vector is used to set a threshold of the corresponding transistor pair 3. More specifically, the first transistor Q1 constituting the transistor pair 3 is set to a first threshold depending on the first data representing the first element, and the second transistor Q2 is set to a second threshold depending on the second data which is the complement data of the first data.

Each of the plurality of second elements of the second vector is applied to the gate of the corresponding transistor pair 3 via the corresponding two word lines WL and /WL. More specifically, a voltage lower by a voltage corresponding to the $\alpha1$ unit of the query than the voltage depending on the third data representing the corresponding second element is applied to the gate of the first transistor Q1 constituting the transistor pair 3. A voltage lower by a voltage corresponding to the $\alpha1$ unit of the query than the voltage corresponding to the fourth data depending on the complement data of the third data is applied to the gate of the second transistor Q2 constituting the transistor pair 3.

It is possible to determine that the degree of similarity between the first vector and the second vector is the highest in the first transistor Q1 and the second transistor Q2 of the transistor pair 3 connected to the bit line BL in which the voltage level has decreased from the predetermined voltage level the slowest among the plurality of bit lines BL in a period in which the gate voltages of the plurality of transistor pairs 3 are scanned (swept) so that the absolute value of a gradually decreases from the state in which the plurality of bit lines BL is set to the predetermined voltage level and the gate voltages of the plurality of transistor pairs 3 are initially set.

Figure 25B:
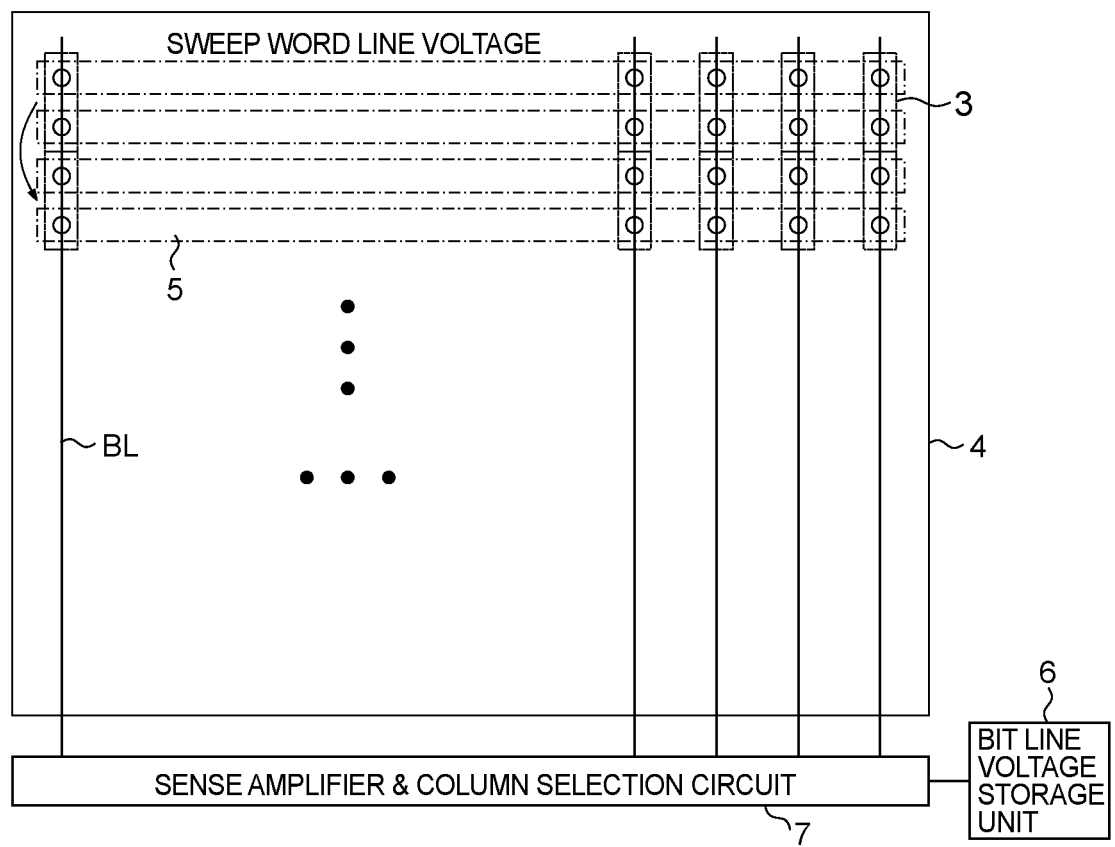
FIG. 25B is a plan layout diagram of the second example of the memory cell array included in the information processing apparatus of FIG. 24.

FIG. 25B is a plan layout diagram of the second example of the memory cell array 4 included in the information processing apparatus 1 of FIG. 24. The memory cell array 4 of FIG. 25B includes a plurality of transistor pairs 3 connected to one word line WL and a bit line voltage storage unit 6 that stores the voltage of the bit line BL. Each transistor pair 3 includes the first transistor Q1 and the second transistor Q2 in FIG. 24.

The plurality of transistor pairs 3 detect whether or not all the corresponding first elements and second elements of the corresponding first vector and second vector are matched or are similar at different timings.

The bit line voltage storage unit 6 increases the voltage to be stored each time each of the plurality of transistor pairs detects that all of the corresponding first elements and second elements of the corresponding first vector and second vector are matched or are similar.

In this manner, in the fourth embodiment, adjusting the gate voltage of each transistor in the string 2 having one end connected to the bit line BL makes it possible to perform similarity search of the query Q and the key K. In addition, the first vector and the second vector having the highest degree of similarity can be detected in the string 2 in which the voltage level of the bit line BL decreases the slowest by connecting one end of each of the plurality of strings 2 to the plurality of bit lines BL, and monitoring the voltage level of the bit line BL while scanning (sweeping) the gate voltage of each transistor in each string 2.

In addition, in the fourth embodiment, adjusting the gate voltages of the first transistor Q1 and the second transistor Q2 having one ends connected to the bit line BL makes it possible to perform similarity search of the query Q and the key K. In the fourth embodiment, the transistor pair 3 having the highest degree of similarity can be determined by performing a similarity search of the query Q and the key K in the transistor pairs 3 connected to the plurality of bit lines BL and monitoring the voltage of the bit line BL while scanning (sweeping) the gate voltages of the plurality of transistor pairs 3.

Fifth Embodiment

Figure 26:
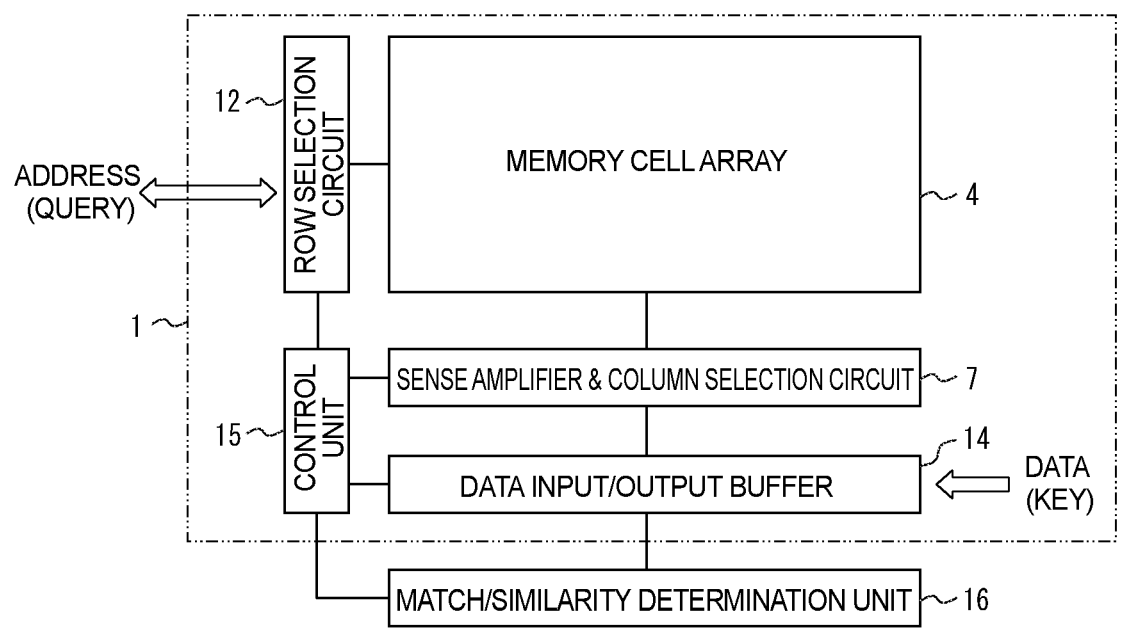
FIG. 26 is a block diagram of a memory system including the information processing apparatus according to the first, second, third, or fourth embodiment.

FIG. 26 is a block diagram of a memory system 11 including the information processing apparatus 1 according to the first, second, third, or fourth embodiment. The memory system 11 in FIG. 26 includes the memory cell array 4, a row selection circuit 12, a sense amplifier & column selection circuit 7, a data input/output buffer 14, a control unit 15, and a match/similarity determination unit 16. Among these units, units other than the match/similarity determination unit 16 constitute the information processing apparatus 1.

The memory cell array 4 is, for example, a NAND flash memory cell array 4. Alternatively, the memory cell array 4 may be the memory cell array 4 using a nonvolatile memory other than the NAND flash memory, or may be the memory cell array 4 using a volatile memory such as a dynamic random access memory (DRAM) or a static random access memory (SRAM).

The memory cell array 4 includes a plurality of word lines WL1 to WLn, a plurality of bit lines BL, and a plurality of memory cell transistors. The memory cell array 4 supplies data indicating whether or not the key K supplied via the bit line BL and the query Q supplied via the word lines WL1 to WLn are matched to the bit line BL based on the processing procedures described in the first to fourth embodiments.

The row selection circuit 12 selects and drives at least a part of the plurality of word lines WL1 to WLn of the memory cell array 4. The row selection circuit 12 sets the voltage levels of the word lines WL1 to WLn to be driven based on the query Q input from the outside.

The sense amplifier & column selection circuit 7 selects and senses at least some of the plurality of bit lines BL of the memory cell array 4. The data input/output buffer 14 buffers data read from the memory cell array 4 and sensed by the sense amplifier & column selection circuit 7, and transmits the key K input from the outside to the sense amplifier & column selection circuit 7.

For example, the match/similarity determination unit 16 outputs a signal indicating whether or not the respective elements of the first vector and the second vector are matched. In addition, the match/similarity determination unit 16 can output information related to strings corresponding to the first vector and the second vector having the highest degree of similarity among the plurality of bit lines BL.

In this manner, in the fifth embodiment, the information processing apparatus 1 can be constructed only by partially changing the internal configuration of the existing memory system, the time required for design change can be shortened, and multi-dimensional match/similarity search can be easily performed by increasing the number of bit lines and word lines of the memory cell array 4.

A Photodetection Apparatus According to One Embodiment

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus that detects, between a first vector including a plurality of first elements and a second vector including a plurality of second elements corresponding to the plurality of first elements, whether or not the corresponding first element and second element among the plurality of first elements and the plurality of second elements are matched or are similar, the information processing apparatus comprising
one or a plurality of strings connected to a first wiring and connected to a plurality of second wirings, wherein
the string includes a plurality of transistor pairs connected in series along a current path having one end connected to the first wiring,
each of the plurality of transistor pairs includes a first transistor and a second transistor connected in series along the current path,
the second wirings different from each other are respectively connected to gates of the first transistor and the second transistor in each of the plurality of transistor pairs,
the first transistor is set to a first threshold depending on first data representing the corresponding first element of the first vector,
the second transistor is set to a second threshold depending on second data that is complement data of the first data,
a voltage depending on third data representing the corresponding second element of the second vector is applied to the second wiring connected to the gate of the first transistor, and
a voltage depending on fourth data that is complement data of the third data is applied to the second wiring connected to the gate of the second transistor.

2. The information processing apparatus according to claim 1, wherein
in the string, when all of the first elements and second elements corresponding to each other of the first vector and the second vector are matched or are similar, all the first transistors and the second transistors in the plurality of transistor pairs are turned on, to change the voltage of the first wiring depending on a current between the string and the first wiring.

3. The information processing apparatus according to claim 1, wherein
the first transistor in each of the plurality of transistor pairs is turned on or off according to a relationship between a voltage depending on the corresponding third data and the first threshold depending on the corresponding first data, and
the second transistor in each of the plurality of transistor pairs is turned on or off according to a relationship between a voltage depending on the corresponding fourth data and the second threshold depending on the corresponding second data.

4. The information processing apparatus according to claim 1, the information processing apparatus further comprising
a third transistor connected between the first transistor and the second transistor included in each of the plurality of transistor pairs, the third transistor being turned on when a predetermined voltage higher than gate voltages of the first transistor and the second transistor is applied to a gate of the third transistor.

5. The information processing apparatus according to claim 4, wherein
the first vector includes a third vector and a fourth vector each including the plurality of first elements,
the second vector includes a fifth vector and a sixth vector each including the plurality of second elements, and
the string alternately performs match or similarity detection between the plurality of first elements in the third vector and the plurality of second elements in the fifth vector, and match or similarity detection between the plurality of first elements in the fourth vector and the plurality of second elements in the sixth vector, by using a plurality of transistors connected in series along the current path in the string.

6. The information processing apparatus according to claim 4, wherein
the string alternately performs:
a first operation comprising setting the first threshold depending on the first data representing the plurality of first elements of the first vector to a first transistor group including two or more transistors connected in order from a side close to the first wiring in an odd-numbered order among a plurality of transistors connected in series along the current path in the string, applying the voltage depending on the third data representing the plurality of second elements of the second vector to a gate of each transistor included in the first transistor group, and applying a voltage at a predetermined voltage level higher than the voltage depending on the third data to a gate of each transistor included in a second transistor group including two or more transistors connected in order from the side close to the first wiring in an even-numbered order among the plurality of transistors; and
a second operation comprising setting the second threshold depending on the second data to the second transistor group, applying the voltage depending on the fourth data to the gate of each transistor included in the second transistor group, and applying a voltage at a predetermined voltage level higher than the voltage depending on the fourth data to the gate of each transistor included in the first transistor group.

7. The information processing apparatus according to claim 1, wherein
a plurality of the first wirings are disposed, and,
one end of at least one of the strings is connected to each of the plurality of first wirings.

8. The information processing apparatus according to claim 1, wherein
one end of each of the plurality of strings is connected to the first wiring,
each of the plurality of strings detects whether or not all of the corresponding first elements and second elements are matched or are similar between the common second vector and the first vector corresponding to each of the plurality of strings, and
the voltage of the first wiring is lowered more greatly as the number of strings in which all of the corresponding first elements and second elements are matched or are similar among the plurality of strings is larger.

9. The information processing apparatus according to claim 8, the information processing apparatus further comprising
a wiring voltage storage that stores the voltage of the first wiring, wherein
the plurality of strings detect whether or not all of the corresponding first elements and second elements of the corresponding first vector and second vector are matched or are similar at different timings, and
the wiring voltage storage lowers the voltage to be stored each time it is detected that all of the corresponding first elements and second elements of the corresponding first vector and second vector are matched or are similar in each of the plurality of strings.

10. The information processing apparatus according to claim 1, wherein
the first transistor is turned on when the voltage depending on the third data is equal to or higher than a voltage of the first threshold depending on the first data, and
the second transistor is turned on when the voltage depending on the fourth data is equal to or higher than a voltage of the second threshold depending on the second data.

11. The information processing apparatus according to claim 1, wherein
the first transistor is turned on when the voltage depending on the third data is equal to or higher than a voltage being lower by a first voltage than a voltage of the first threshold, and
the second transistor is turned on when the voltage depending on the fourth data is equal to or higher than a voltage being lower by the first voltage than a voltage of the second threshold.

12. The information processing apparatus according to claim 11, wherein
a plurality of the first wirings are disposed,
one end of at least one of the strings is connected to each of the plurality of first wirings, and
it is determined that a degree of similarity between the first vector and the second vector is highest in one of the strings whose voltage level has decreased the earliest within a period in which voltages of the plurality of second wirings are changed continuously or stepwise.

13. An information processing apparatus comprising:
a first transistor and a second transistor;
a first wiring connected to one end of each of the first transistor and the second transistor;
a second wiring connected to a gate of the first transistor; and
a third wiring connected to a gate of the second transistor, wherein
the first transistor is set to a first threshold depending on first data,
the second transistor is set to a second threshold depending on second data that is complement data of the first data,
a voltage depending on third data is applied to the second wiring, and
a voltage depending on fourth data that is complement data of the third data is applied to the third wiring.

14. The information processing apparatus according to claim 13, wherein
when both the first transistor and the second transistor are turned off, the first wiring is raised to a higher voltage than when at least one of the first transistor and the second transistor is turned on.

15. The information processing apparatus according to claim 14, wherein
the first transistor is turned off when the voltage depending on the third data on the second wiring is equal to or less than the first threshold, and
the second transistor is turned off when the voltage depending on the fourth data on the third wiring is equal to or less than the second threshold.

16. The information processing apparatus according to claim 14, wherein
the first transistor is turned off when a voltage being lower by a first voltage than the voltage depending on the third data on the second wiring is equal to or lower than the first threshold, and
the second transistor is turned off when a voltage being lower by the first voltage than the voltage depending on the fourth data on the third wiring is equal to or lower than the second threshold.

17. The information processing apparatus according to claim 13, the information processing apparatus comprising:
a plurality of the first wirings capable of, between a first vector including a plurality of first elements and a second vector including a plurality of second elements corresponding to the plurality of first elements, detecting that all of corresponding first elements and second elements are matched or are similar; and
a plurality of first transistor pairs each having one end connected to a corresponding one of the plurality of first wirings, wherein
the second wiring and the third wiring are provided for each of the plurality of first transistor pairs, and
each of the plurality of first transistor pairs includes the first transistor and the second transistor.

18. The information processing apparatus according to claim 17, wherein
it is determined that a degree of similarity between the first vector and the second vector is highest in one of the plurality of first transistor pairs connected to one first wiring whose voltage level decreased the most slowly from a predetermined voltage level among the plurality of first wirings, within a period in which a gate voltage of each transistor of the plurality of first transistor pairs is changed continuously or stepwise from a state in which the plurality of first wirings is set to the predetermined voltage level and the gate voltage of each transistor of the plurality of first transistor pairs is initially set.

19. The information processing apparatus according to claim 13, the information processing apparatus further comprising
a wiring voltage storage that stores a voltage of the first wiring, wherein
a plurality of second transistor pairs are connected to the first wiring,
each of the plurality of second transistor pairs includes the first transistor and the second transistor,
the plurality of second transistor pairs detect, between a first vector including a plurality of first elements and a second vector including a plurality of second elements corresponding to the plurality of first elements, whether or not all of corresponding first elements and second elements of the first vector and the second vector are matched or are similar at different timings, and
the wiring voltage storage raises a voltage to be stored each time each of the plurality of second transistor pairs detects that all of the corresponding first elements and second elements of the corresponding first vector and second vector are matched or are similar.

20. A memory system that detects, between a first vector including a plurality of first elements and a second vector including a plurality of second elements corresponding to the plurality of first elements, whether or not the corresponding first element and second element among the plurality of the first elements and the plurality of second elements are matched or are similar, the memory system comprising:

a nonvolatile memory including a first wire and a plurality of second wires;

a sense amplifier that senses a voltage signal on the first wiring; and a determination unit that determines whether or not all of the corresponding first elements and second elements are matched or are similar between the first vector and the second vector depending on the voltage signal sensed by the sense amplifier, wherein the nonvolatile memory includes:

a string connected to the first wiring and connected to the plurality of second wirings, the string includes a plurality of transistor pairs connected in series along a current path having one end connected to the first wiring, each of the plurality of transistor pairs includes a first transistor and a second transistor connected in series along the current path, the second wirings different from each other are respectively connected to gates of the first transistor and the second transistor in each of the plurality of transistor pairs, the first transistor is set to a first threshold depending on first data representing the corresponding first element of the first vector, the second transistor is set to a second threshold depending on second data that is complement data of the first data, a voltage depending on third data representing the corresponding second element of the second vector is applied to the second wiring connected to the gate of the first transistor, a voltage depending on fourth data that is complement data of the third data is applied to the second wiring connected to the gate of the second transistor, and in the string, when all of the first elements and second elements corresponding to each other are matched or are similar, all the first transistors and the second transistors in the plurality of transistor pairs are turned on, and the voltage of the first wiring is changed according to a current between the string and the first wiring.

* * * * *